(12) United States Patent
Nishihara

(10) Patent No.: US 8,447,933 B2
(45) Date of Patent: May 21, 2013

(54) MEMORY ACCESS CONTROL SYSTEM, MEMORY ACCESS CONTROL METHOD, AND PROGRAM THEREOF

(75) Inventor: Kosuke Nishihara, Tokyo (JP)

(73) Assignee: NEC Corporation, Tokyo (JP)

(*) Notice: Subject to any disclaimer, the term of this patent is extended or adjusted under 35 U.S.C. 154(b) by 839 days.

(21) Appl. No.: 12/526,233

(22) PCT Filed: Feb. 4, 2008

(86) PCT No.: PCT/JP2008/051746
§ 371 (c)(1),
(2), (4) Date: Aug. 6, 2009

(87) PCT Pub. No.: WO2008/108129
PCT Pub. Date: Sep. 12, 2008

(65) Prior Publication Data
US 2010/0223431 A1    Sep. 2, 2010

(30) Foreign Application Priority Data
Mar. 6, 2007 (JP) .................................. 2007-055694

(51) Int. Cl.
*G66F 12/00* (2006.01)

(52) U.S. Cl.
USPC .................................. 711/137; 711/E12.052

(58) Field of Classification Search
USPC .................................. 711/127, 137; 707/798
See application file for complete search history.

(56) References Cited

U.S. PATENT DOCUMENTS 5,699,117 A * 12/1997 Uramoto et al. ........... 348/390.1
2005/0071841 A1    3/2005 Hoflehner et al.

FOREIGN PATENT DOCUMENTS

| CN | 1829964 A | 9/2006 |
|---|---|---|
| JP | 4-060863 A | 2/1992 |
| JP | 2001005720 A | 1/2001 |
| JP | 2002312180 A | 10/2002 |
| JP | 2005078264 A | 3/2005 |
| JP | 2006041898 A | 2/2006 |
| JP | 2007501449 A | 1/2007 |
| TW | 508491 | 11/2002 |
| TW | 1226576 | 1/2005 |
| TW | 1242721 | 11/2005 |

(Continued)

OTHER PUBLICATIONS

International Search Report for PCT/JP2008/051746 mailed Apr. 8, 2008.
Taiwanese Office Action for TW10120123760 issued Feb. 9, 2012.

*Primary Examiner* — Reginald Bragdon
*Assistant Examiner* — Hamdy S Ahmed

(57) ABSTRACT

In a multi-core processor of a shared-memory type, deterioration in the data processing capability caused by competitions of memory accesses from a plurality of processors is suppressed effectively. In a memory access controlling system for controlling accesses to a cache memory in a data read-ahead process when the multi-core processor of a shared-memory type performs a task including a data read-ahead thread for executing data read-ahead and a parallel execution thread for performing an execution process in parallel with the data read-ahead, the system includes a data read-ahead controller which controls an interval between data read-ahead processes in the data read-ahead thread adaptive to a data flow which varies corresponding to an input value of the parallel process in the parallel execution thread. By controlling the interval between the data read-ahead processes, competitions of memory accesses in the multi-core processor are suppressed.

25 Claims, 17 Drawing Sheets

FOREIGN PATENT DOCUMENTS

| | | |
|---|---|---|
| TW | 1258665 | 7/2006 |
| WO | 2005033926 A | 4/2005 |
| WO | 2005033931 A | 4/2005 |
| WO | 2005033936 A | 4/2005 |

* cited by examiner

MEMORY ACCESS CONTROL SYSTEM, MEMORY ACCESS CONTROL METHOD, AND PROGRAM THEREOF

This application is the National Phase of PCT/JP2008/051746, filed Feb. 4, 2008, which is based upon and claims the benefit of priority from Japanese patent application No. 2007-055694, filed on Mar. 6, 2007, the disclosure of which is incorporated herein in its entirety by reference.

TECHNICAL FIELD

The present invention relates to a memory access controlling system, a memory access controlling method, and a program thereof. In particular, the present invention relates to a memory access controlling system, a memory access controlling method, and a program thereof, for controlling a process such as a data read-ahead process which is mostly constituted of memory accesses in a multi-core processor of a shared-memory type.

BACKGROUND ART

Data read-ahead, with respect to a multi-core processor, is a system in which data required for a process for high-speed operation is read ahead and is stored in a cache memory. This system has been widely used (see Patent Document 1 and Patent Document 2).

For instance, a data read-ahead system disclosed in Patent Document 1 is well-known as a system for performing a data read-ahead in motion compensation (see FIG. 15) which is a process of decoding a bitstream encoded by means of inter-frame prediction used for compressing moving images.

FIG. 15 is a block diagram showing a method of decoding a bitstream which is compressed by means of inter-frame prediction. In FIG. 15, a bitstream supplied from the outside is first input to a variable-length code decoder 1001. The variable-length code decoder 1001 performs predetermined variable-length decoding on the input bitstream according to the information stored in the bitstream, and supplies the obtained information regarding a coding mode, a quantization parameter, a quantized orthogonal transform coefficient and the like to an inverse quantization unit 1002.

The variable-length code decoder 1001 also supplies information of a reference picture and a motion vector to a motion compensation unit 1004. The inverse quantization unit 1002 performs predetermined inverse quantization with respect to the quantized orthogonal transform coefficient supplied, and supplies the resulting information of the orthogonal conversion efficient to an inverse orthogonal transducer 1003. The inverse orthogonal transducer 1003 performs predetermined inverse orthogonal transformation on the orthogonal transform coefficient, and supplies the resulting differential image information to an adder 1006.

On the other hand, the motion compensation unit 1004 performs predetermined motion compensation using a reference picture stored in a frame memory 1005 according to the supplied information of the reference picture and the motion vector, and supplies the resulting predicted image information to the adder 1006. The adder 1006 adds the differential image supplied from the inverse orthogonal transducer 1003 and the predicted image supplied from the motion compensation unit 1004, and supplies the resulting decoded image information to the frame memory 1005. The frame memory 1005 stores the predetermined number of pieces of the decoded image supplied from the adder 1006, and supplies them to the motion compensation unit 1004, and also outputs the decoded image to the outside at a predetermined timing.

In general, as the size of a frame memory which stores decoded images is extremely large, a frame memory is seldom accommodated within a cache memory in a system having a strict restriction for resources such as an installed system.

As such, when a decoded image is written into a frame memory, or when a reference picture is referred to, cache errors will be caused frequently, which prevents high-speed decoding. In order to solve this problem, Patent Document 1 discloses that corresponding data is read before a frame memory is accessed and the data is stored in a cache memory to thereby increase the decoding speed.

A data read-ahead system described in Patent Document 2 is characterized as to include a dedicated thread for performing data read-ahead, a device which analyzes a source code and inserts an activating process of the data read-ahead thread to the optimum position, and a unit which measures the execution preference order of the program and the cache utilization. The system attempts to perform the optimum operating process by analyzing the data flow at the time of data compilation, inserting a process of generating a data read-ahead thread at an appropriate position, and measuring the execution preference order of the program and the cache utilization during execution, to thereby determine whether or not to perform data read-ahead.

In the data read-ahead method of Patent Document 1, data read-ahead of a relatively small capacity is performed each time the corresponding data is required.

In contrast, in the data read-ahead method of Patent Document 2, data read-ahead is performed with a dedicated thread for data read-ahead independently of the main thread. Such a difference has significant meaning particularly in a multi-core processor system.

That is, as a multi-core processor system (a reference numeral 100 in FIG. 14) can perform a plurality of threads in parallel simultaneously, and perform data read-ahead using a data read-ahead thread without disturbing the execution flow of the main thread, the method using a data read-ahead thread is capable of performing more effective data read-ahead. Further, it is particularly effective if there is an idle processor when data read-ahead is desired, because a data read-ahead process which is not required primarily can be performed with an extra processor independent of the main thread.

As obvious from the above description, in the case of decoding a compressed moving image, an idle processor is caused when a process is divided by functions and performed in parallel. Referring to FIG. 15, a variable-length code decoding process performed by the variable-length code decoder 1001 is required to be performed sequentially. Further, processes performed by the inverse quantization unit 1002, by the inverse orthogonal transducer 1003, and by the motion compensation unit 1004 respectively do not depend on one another in a macro block unit, and are divided by the functions and can be performed in parallel.

Therefore, after decoding for one frame by the variable-length code decoder 1001 is completed, if the processes with respect to the frame by the inverse quantization unit 1002, the inverse orthogonal transducer 1003 and the motion compensation unit 1004 are performed in parallel while the screen is split, when the variable-length code decoder 1001 performs decoding, the units other than the processor is in an idle state. If a frame memory area for storing the decoded image is desired to be read-ahead and secured in the cache memory, the data read-ahead thread can be executed by an idle processor.

FIG. 14 shows a hardware configuration of a multi-core processor system 100 in the conventional example described above. In FIG. 14, the multi-core processor system 100 includes n numbers of processors 111, 112, 113 . . . , a memory controller 120 shared by the processors 111, 112, 113 . . . , a cache memory 130 in which storing operation is controlled by the memory controller 120, and a main memory 140 required by the cache memory 130.

Reference numerals 151, 152, 153 . . . indicate buses for connecting the memory controller 120 and the respective processors 111, 112, 113 . . . . Further, reference numerals 160 and 170 indicate buses for connecting the memory controller 120 and the cache memory 130, and connecting the cache memory 130 and the main memory 140, respectively. The main memory 140 is also connected to the memory controller 120 with a bus not shown.

The main memory 140 is a large-capacity storage device although memory accessing is performed at a low speed. The cache memory 130 is a storage device having a small capacity but capable of performing high-speed accessing, which temporarily stores a part of commands and data of the main memory 140. The memory controller 120 performs a memory access control between each of the processors and the cache memory 130, and a memory access control between the cache memory 130 and the main memory 140. Each of the processors 111, 112 and 113 is an operating device which executes commands stored in the cache memory 130 or in the main memory 140.

If a program is written to be executed using a plurality of threads, the threads can be executed in parallel by different processors even though they belong to the same program. Further, the respective threads may share data via the cache memory 130 or the main memory 140.

Patent Document 1: Japanese Patent Laid-Open Publications No. 2006-41898
Patent Document 2: Japanese Patent Laid-Open Publications No. 2005-78264

DISCLOSURE OF THE INVENTION

Problems to be Solved by the Invention

However, the related art described above has involved various problems, conventionally.

A first problem is that in the case of performing a memory access neck process such as a data read-ahead process in which the process is mostly constituted of memory accesses in a multi-core processor of a shared-memory type, if memory accesses such as data read-ahead are operated in parallel, another operating process performed by another processor will be interrupted so that the processing capability is deteriorated.

Deterioration in the processing capability which may be caused in each processor when the memory accesses compete due to parallel operations will be described below with reference to FIGS. 14 and 17.

In the method disclosed in Patent Document 2, a data read-ahead process 232 executed on a data read-ahead thread 212 in the processor 112 shown in FIG. 14 and a parallel execution process 231 with the data read-ahead (hereinafter simply referred to as a "parallel execution process") executed on a parallel execution thread 211 in another processor 111 are operated independently, without communicating with each other. In the multi-core processor system 100, these threads 211 and 212 are operated on the different processors 111 and 112.

Therefore, if memory accesses are performed simultaneously, competitions will be cased among memory accesses from the respective processors on the bus 160 between the memory controller 120 and the cache memory 130 or on the bus 170 between the cache memory 130 and the main memory 140 shown in FIG. 14. In particular, since the data read-ahead processor 232 of the data read-ahead thread 212 performs memory accesses continuously, memory access competitions with another processor are easily caused. As described above, a disadvantage that a memory access by the parallel execution processor 231 is interrupted whereby the processing capability is deteriorated has been caused by performing a data read-ahead process 24.

As described above, access competitions described above can be reduced by providing an interval each time a data read-ahead process is performed, without performing data read-ahead processes continuously until completion. As the data read-ahead interval becomes longer, access competitions are reduced. Consequently, a necessary time for a parallel process by the parallel execution processor 231 is decreased. On the other hand, however, the necessary time for a read-ahead process by the data read-ahead processor 232 is increased.

FIG. 17 shows a conceptual graph which indicates a necessary time for a parallel execution processor 231 and a necessary time of the data read-ahead processor 232 or the data read-ahead processor 233 when the data read-ahead interval changes. In FIG. 17, a downward-sloping line 2001 indicates a necessary time for the parallel execution processor 231, and an upward-sloping line 2002 indicates a necessary time for the data read-ahead processor 232. If a point 2003 where the necessary time of the read-ahead processor 232 and the necessary time of the parallel execution processor 231 are balanced can be found, the optimum data read-ahead interval can be determined.

However, it is not easy to find the point area 2003 where the data read-ahead interval becomes the optimum.

The reason will be described as a second problem.

The second problem arises because a control of a data read-ahead process to be optimum to reduce memory access competitions is difficult only with a static analysis of a data flow and memory access timing at the time of program compiling.

This is because a data flow and memory access timing vary largely depending on the inputting conditions, and further, in a multi-core processor system, memory access timing is not always the same even if the input data is the same. This is understandable that the line 2001 indicating the parallel execution process in FIG. 17 is not always the same, which means that the optimum point 2003 changes each time. Therefore, it is difficult to control data read-ahead with a static analysis at the time of program compilation, leading to a need of dynamic control during execution of a program.

As the methods described in Patent Documents 1 and 2 described above do not consider data read-ahead timing, access competitions cannot be prevented. Further, in Patent Document 2, even though a data flow is analyzed, it is only a static analysis of a data flow at the time of program compilation. With this method, it is difficult to analyze a data flow in a system where operation of a program varies significantly according to input conditions, such as decoding of a compressed moving image.

Object of the Invention

It is an exemplary object of the invention to provide a memory access controlling system, a memory access controlling method, and a program thereof, capable of effectively reducing competitions even if a plurality of processors perform memory accesses in a process such as a data read-ahead process which is mostly configured of memory accesses to thereby effectively maintain the processing capability of each processor, in a multi-core processor of a shared-memory type.

Means of Solving the Problem

In order to achieve such an exemplary object, a memory access controlling system according to an exemplary aspect of the invention is a system for controlling accesses to a cache memory in a data read-ahead process when a multi-core processor of a shared-memory type processes, by accessing the cache memory, a task including a data read-ahead thread for performing the data read-ahead process and a parallel execution thread for performing an execution process in parallel with the data read-ahead process. The system includes a data read-ahead controller which controls an interval between data read-ahead processes in the data read-ahead thread adaptive to a data flow which varies corresponding to an input value of the parallel process in the parallel execution thread.

In the case of applying the invention to image decoding, the memory access controlling system according to an exemplary aspect of the invention is a system for controlling accesses to a cache memory in a data read-ahead process when a multi-core processor of a shared-memory type processes, by accessing the cache memory, a task including a data read-ahead thread for reading ahead data of a corresponding address of a frame memory for storing decoded image information into a memory and a parallel execution thread in which decoded image information is stored into a memory in parallel with the read-ahead process of the corresponding address. The decoded image information is formed by adding a differential image generated by inverse orthogonal transformation and predicted information generated by motion compensation. The system includes a data read-ahead controller which controls an interval between data read-ahead processes in the data read-ahead process thread adaptive to a data flow which varies corresponding to an input value of a parallel process in the parallel execution thread.

Although the case of constructing the present invention as hardware has been described, the present invention may be constructed as a program or a method.

A memory access controlling program according to another exemplary aspect of the invention is configured to cause a computer, which constitutes a memory access controlling system which controls accesses to a cache memory in a data read-ahead process when a multi-core processor of a shared-memory type processes a task including a data read-ahead thread for performing the data read-ahead process and a parallel execution thread for performing an execution process in parallel with the data read-ahead process by accessing the cache memory, to perform a function of controlling an interval between data read-ahead processes in the data read-ahead thread adaptive to a data flow which varies corresponding to an input value of a parallel process in the parallel execution thread.

In the case of applying the invention to image decoding, the memory access controlling program according to another exemplary aspect of the invention is configured to cause a computer, which constitutes a memory access controlling system for controlling accesses to a cache memory in data read-ahead process, to perform, when a multi-core processor of a shared-memory type processes, by accessing the cache memory, a task including a data read-ahead thread for reading ahead data of a corresponding address of a frame memory for storing decoded image information into a memory and a parallel execution thread for storing a decoded image information into the memory in parallel with the read-ahead of the corresponding address, a function of controlling an interval between data read-ahead processes in the data read-ahead thread adaptive to a data flow which varies corresponding to an input value of the parallel process in the parallel execution thread. The decoded image information is formed by adding a differential image generated by inverse orthogonal transformation and a predicted image generated by motion compensation.

Further, a memory access controlling method according to still another exemplary aspect of the invention is a method for controlling accesses to a cache memory in data read-ahead processes when the multi-core processor of a shared-memory type processes, by accessing the cache memory, a task including a data read-ahead thread for performing data read-ahead and a parallel execution thread for performing a process in parallel with the data read-ahead. The method is configured to control an interval between data read-ahead processes in the data read-ahead thread adaptive to a data flow which varies corresponding to an input value of the parallel process in the parallel execution thread.

Effect of the Invention

As an exemplary advantage according to the invention, even in the case of performing a memory access neck process such as a data read-ahead process which is mostly constituted of memory accesses in a multi-core processor of a shared-memory type, deterioration in the processing capability caused by memory access competitions between processors performing memory accesses in parallel can be suppressed effectively by performing a data read-ahead control as described above so as to balance the necessary times for respective parallel processes at real time. This allows effective memory accesses.

BEST MODE FOR CARRYING OUT THE INVENTION

Hereinafter, exemplary embodiments of the invention will be described in detail with reference to the drawings.

As shown in FIG. 1, a memory access controlling system according to an exemplary embodiment of the invention is a system for controlling accesses to a cache memory 130 for a data read-ahead process when processors 1, 2 . . . n access the cache memory 130 to process a task including a data read-ahead thread for performing data read-ahead process and a parallel execution thread for performing an execution process in parallel with the data read-ahead process. As shown in FIGS. 2, 8 and 11, the memory access controlling system includes, as the basic configuration thereof, a data read-ahead controller 22 which controls an interval between data read-ahead processes in the data read-ahead thread adaptive to a data flow which varies corresponding to an input value of the parallel process in the parallel execution thread.

Therefore, when the processors 1, 2 . . . n access the cache memory 130 so as to process a task including the data read-ahead thread for performing a data read-ahead process and the parallel execution thread for performing an execution process in parallel with the data read-ahead process as shown in FIG. 1, the data read-ahead controller 22 controls the interval between the data road-ahead processes in the data read-ahead thread adaptive to the data flow which varies corresponding to an input value of the parallel process in the parallel execution thread as shown in FIGS. 2, 8 and 11.

According to the exemplary embodiment of the invention, even in the case where a multi-core processor of a shared-memory type performs a memory access neck process such as a data read-ahead process which is mostly configured of memory accesses, deterioration in the processing capability caused by memory access competitions between a plurality of processors performing memory accesses in parallel can be suppressed by performing a data read-ahead control so as to balance the necessary times for respective parallel processes at real time. Thereby, deterioration in the processing capability caused by memory access competitions performed by a plurality of processors can be controlled effectively, providing an effect that effective memory accesses can be realized.

First Exemplary Embodiment

An exemplary embodiment of the invention will be further described based on a specific example. As a first exemplary embodiment, an example in which a necessary time for a parallel process is predicted and an interval between data read-ahead processes is controlled based on the predicted time will be described first.

As shown in FIG. 1, in a multi-core processor system 101, a processor 2 of a shared-memory type processes a data read-ahead thread for performing data read-ahead, and a processor 1 of a shared-memory type processes a parallel execution thread, for instance. In such a case, when processors 1, 2 ... n access the cache memory 130 so as to process a task including the data read-ahead thread and the parallel execution thread, it is required to control accesses to the cache memory 130 for the data read-ahead process.

As shown in FIG. 1, the first exemplary embodiment of the invention is to control accesses to the cache memory 130 in the data read-ahead process, in which the multi-core processor system 101 includes n pieces of processors 1, 2, 3 ..., a memory controller 120 shared by the processors 1, 2, 3 ..., a cache memory 130 in which a storing operation is controlled by the memory controller 120, and a main memory 140.

Reference numerals 51, 52, 53 ... indicate buses for connecting the main controller 120 and each of the processors 1, 2, 3 ... respectively. Further, reference numerals 161 and 170 indicate buses for connecting the memory controller 120 and the cache memory 130, and for connecting the cache memory 130 and the main memory 140, respectively. The main memory 140 is also connected with the memory controller 120 via a bus not shown.

The main memory 140 is a large-capacity storage device although memory accesses are performed at a low speed. The cache memory 130 is a storage device which has a small capacity but is capable of performing a high-speed accessing, which temporarily stores a part of commands and data of the main memory 140. The memory controller 120 controls memory accesses between each of the processors 1, 2, 3 ... and the cache memory 130, and between the cache memory 130 and the main memory 140. Each of the processors 1, 2, 3 ... is an operational device which executes commands stored in the cache memory 130 or the main memory 140.

As shown in FIG. 2, a data read-ahead process is performed in a data read-ahead thread executed by the processor 2 and a parallel process is performed in parallel with the data read-ahead process in a parallel execution thread executed by the processor 1, for example.

In the data read-ahead thread in the first exemplary embodiment of the invention, the processor 2 performs a data read-ahead process and a data read-ahead control process. If it is configured as hardware, a processing system 2A in which the processor 2 performs a data read-ahead thread includes a data read-ahead processor 21 and a data read-ahead controller 22. In the parallel execution thread in the first exemplary embodiment, the processor 1 performs a parallel execution process and a process to predict a necessary time for the parallel execution process. When it is configured as hardware, a processing system 1A in which the processor 1 performs the parallel execution thread includes a parallel execution processor 11 and a necessary time prediction unit 12.

The parallel execution processor 11 of the processing system 1A performs a parallel process, and the necessary time prediction unit 12 predicts a necessary time for the parallel process according to the input value of the parallel process to the parallel execution processor 11. According to the necessary time predicted by the necessary time prediction unit 12, the data read-ahead controller 22 of the processing system 2A determines a control parameter for the data read-ahead process in which the memory access competitions become the minimum and the interval between the data read-ahead processes becomes the maximum provided that the ending time of the data read-ahead process does not exceed the ending time of the parallel execution process. Then, the data read-ahead processor 21 performs read-ahead of data according to the control parameter determined by the data read-ahead controller 22. The data of the necessary time predicted by the necessary time prediction unit 12 of the processing system 1A is transmitted to the data read-ahead controller 22 of the processing system 2A via an inter-thread communication unit 200.

As described above, since the memory access controlling function of the data read-ahead controller 22 effectively operates so as to balance the necessary time for a parallel process performed by another processor in real time as described above, it is possible to effectively prevent deterioration in the processing capability caused by memory access competitions between processors. Therefore, effective memory accesses can be realized.

Further, since the data read-ahead controller 22 sets a data read-ahead interval (timing of performing memory access) of the data read-ahead processor 21 based on the predicted value of the necessary time for data processing by the parallel execution processor 11 provided to another processor 1, access competitions can be reduced more effectively.

Note that if a program stored in the main memory 140 is written (configured) such that it can be executed using a plurality of threads, parallel execution can be performed by the processors 1, 2 and 3 in the threads 1A, 2A and 3A which belong to the same program. Further, the respective threads can share data via the cache memory 130 or the main memory 140. It is the same in the case of the second and third exemplary embodiments described later.

The inter-thread communication unit 200 is configured to store communication information in the cache memory 130, to perform reading and writing by the memory controller 120 to the cache memory 130, and to control information transmission between the threads (between the processors).

The processing system 2A is activated on the processor 2, and the processing system 1A is activated on the processor 1, whereby they perform predetermined data processing respectively.

The necessary time prediction unit 12 predicts a necessary time for the parallel execution processor 11 using an input value which is input to the processing before execution of the parallel execution processor 11, and provides the predicted value to the inter-thread communication unit 200.

The inter-thread communication unit 200 is configured of a part of the cache memory 130 or the main memory 140, which transmits the necessary time (predicted value) for data processing in the processing system 1A to the processing system 2A at predetermined timing. At the same time, the inter-thread communication unit 200 temporarily stores the predicted value output from the necessary time prediction unit 12, and keeps it until the predicted value is read from the data read-ahead controller 22.

The data read-ahead controller 22 reads the predicted value of the parallel execution processor 11 stored in the inter-thread communication unit 200, and determines a control parameter of the data read-ahead process in the data read-ahead processor 21 based on the read predicted value such that the memory access competitions become the minimum. The control by the data road-ahead controller 22 is to provide a proper interval for each data read-ahead process such that the operation ending time of the data read-ahead processor 21 does not exceed the operation ending time of the parallel execution processor 11.

The reason for providing a data read-ahead interval is to reduce the possibility of causing memory access competitions. Therefore, by designating the optimum data read-ahead interval as a control parameter for a data read-ahead process, the data read-ahead process can be performed effectively. The determination of a parameter is performed by constructing a model in which a prepared data read-ahead necessary time and a data read-ahead interval are correlated in advance so as to derive a data read-ahead interval in which the data read-ahead necessary time does not exceed the predicted value.

The data read-ahead processor 21 performs the data read-ahead process according to the parameter determined by the data read-ahead controller 22, and stores the data from the main memory 140 into the cache memory 130. In such a case, in an architecture in which a dedicated command for data read-ahead is preset, a data read-ahead process is performed using the dedicated command. On the other hand, in an architecture in which a dedicated command for data read-ahead is not prepared, it is necessary to perform data read-ahead using a data access command explicitly.

Operation of First Exemplary Embodiment

Next, the overall operation of the first exemplary embodiment will be described based on FIGS. 2 and 3.

First, before the parallel execution processor 11 operates, the necessary time prediction unit 12 predicts a necessary time required for the parallel execution processor 11 using an input value which is input to the processor 11, and outputs the necessary time to the processing system 2A (step S101, necessary time prediction step).

Next, in the processing system 2A, the data read-ahead controller 22 receives a predicted value of the necessary time obtained in the step S101 via the inter-thread communication unit 200 (step S102, necessary time predicted value receiving step).

The data read-ahead controller 22 determines a data read-ahead control parameter of the data read-ahead processor 21 based on the predicted value obtained. The determination of the control parameter is carried out such that the data read-ahead necessary time and the model to which the control parameter is correlated are referred to, whereby an interval between data read-ahead operations is specified (step S103, data read-ahead interval setting step).

Then, the data read-ahead controller 22 activates the data read-ahead processor 21 according to the control parameter determined in the step S103, performs the data read-ahead processes according to the data read-ahead operation interval set, and stores the data from the main memory 140 into the cache memory 130 (data read-ahead processing step). In this case, in an architecture in which a dedicated command for data read-ahead is prepared, data read-ahead is performed using the dedicated command. On the other hand, in an architecture in which no dedicated command for data read-ahead is prepared, data read-ahead is performed using a data access command explicitly (step S104).

The contents of the step S104 are repeated until the data read-ahead is completed (step S105).

Since the exemplary embodiment is configured such that the necessary time prediction unit 12 is provided in the processing system 1A, a necessary time for data processing performed by the parallel execution processor 11 is predicted in advance, and a control parameter for the data read-ahead process in the processing system 2A is set so as to provide a data read-ahead interval, a data read-ahead process suitable for the data flow which varies corresponding to an input value of the parallel execution processor 11 can be performed in the processing system 2A. Thereby, it is possible to prevent or suppress memory access competitions effectively and efficiently.

In the operation of the first exemplary embodiment described above, the components of the respective steps may be formed as a program so as to cause a computer to perform the program. With this configuration, the same operational effect as that of the first exemplary embodiment can be realized.

Second Exemplary Embodiment

Next, an example in which the memory access controlling system according to the present invention is applied to image decoding will be described as a second exemplary embodiment.

As shown in FIGS. 4 to 7, the memory access controlling system according to the second exemplary embodiment of the invention is constructed as a system which controls accesses to a cache memory in a data read-ahead process when a multi-core processor of a shared-memory type processes, by accessing the cache memory, a task including a data read-ahead thread for reading ahead data of a corresponding address of the frame memory 515 for storing decoded image information in the memory and a parallel execution thread for storing decoded image information in which a differential image generated by inverse orthogonal transformation and a predicted image generated by motion compensation to be performed in parallel with the read-ahead of the address in the memory. The memory access controlling system has a data read-ahead controller which controls an interval between data read-ahead processes in the data read-ahead thread adaptive to a data flow which varies corresponding to an input value of the parallel process in the parallel execution thread.

The second exemplary embodiment of the invention is a memory access controlling system in a moving picture decoding system for decoding a moving picture which is encoded by means of an inter-frame prediction method. In the second exemplary embodiment, a motion compensation unit 514 also works as the data read-ahead processor 21 of the first exemplary embodiment, and an object of data read-ahead corresponds to the corresponding address of the frame memory 515 (corresponding to 1005 in FIG. 15) for storing image information generated by the image decoding. Further, a variable length code decoder 521 (corresponding to 1001 in FIG. 15) corresponds to the parallel execution processor 11 of the first exemplary embodiment. The image information corresponds to decoded image information in which a differential image generated by the inverse orthogonal transducer 513 (corresponding to 1003 in FIG. 15) and a predicted image generated by the motion compensation unit 514 (corresponding to 1004 in FIG. 15) are added.

Further, in FIG. 4, a variable length code decoding necessary time prediction unit 522 corresponds to the necessary time prediction unit 12 of the first exemplary embodiment, and the variable length code decoding necessary time prediction unit 522 predicts a necessary time for a variable length code decoding process by using an input value input to the variable length code decoder 521, and outputs the predicted necessary time. Although not shown in FIG. 4, the second exemplary embodiment includes a data read-ahead controller corresponding to the data read-ahead controller 22 of the first exemplary embodiment, and the data read-ahead controller (22) inputs data of the necessary time predicted by the variable length code necessary time prediction unit 522, and controls an interval between data read-ahead processes in the variable length code decoding process adaptive to a data flow which varies corresponding to the input vale of the variable length code decoder 521. Reference numeral 512 is a Inverse quantization unit.

FIG. 5 shows that if a parameter of an input bitstream such as an image size, a frame rate, or the like is constant, a necessary time for decoding process (parallel execution process) in the variable length code decoder 521 correlates to the bit length of the input bitstream. FIG. 5 is a chart showing the necessary time for one-frame variable length code decoding process (parallel execution process) with respect to the bit length of an input bitstream in the case that the image size is QVGA and the frame rate is 30 fps.

The necessary time can be predicted by previously configuring a model formula for calculating the necessary time for a decoding process performed by the variable code decoder 521 from the bit length of the input bitstream. Simply, it is also acceptable to perform linear approximation (y−0.2443x+2.7288) from the data obtained through observation and use a model formula for predicting linearly from the input bit length.

FIG. 6 shows a state in which a decoding process performed by the variable length code decoder 521 (corresponding to the parallel execution processor 11 in FIG. 2) and a data read-ahead process performed by the data read-ahead processor 21 are operated in parallel, before a motion compensation process by the motion compensation unit 514, an inverse orthogonal transformation process by the inverse orthogonal transducer 513 and an adding process by the adder 516 are performed.

Note that, for motion compensation and inverse orthogonal transformation, a process is divided within a frame so as to perform a parallel load distribution process. More specifically, the decoding process by the variable length code decoder 521 is performed by the processing system 1A in FIG. 6, and the data read-ahead process with respect to the frame memory 515 by the data read-ahead processor 21 is performed by a system different from the processing system 1A, that is, the processing system 2A.

As a method for providing an interval each time data read-ahead is performed, a loop in which the loop body is a NOP command is inserted and the timing of performing data read-ahead is controlled. A NOP command is a command for spending one cycle without any operation. The number of cycles of the loop becomes a parameter for setting a data read-ahead interval.

By applying the exemplary embodiment, it is possible to effectively suppress or prevent deterioration in the processing capability caused by memory access competitions between variable length code decoding and data read-ahead, which enables effective memory accesses.

Next, operation of the second exemplary embodiment will be described based on FIG. 7.

First, the variable length code decoding necessary time prediction unit 522 predicts a necessary time for a decoding process to be performed by the variable length code decoder 521. For prediction, an input value which is input to the variable length code decoder 521 is used. Note that prediction may be performed by using the bit length of a bitstream input to the variable length code decoder 521 as an input value (step S111, variable length code decoding necessary time prediction step).

Next, a necessary time (predicted value) for a decoding process by the variable length code decoder 521 is transmitted from the processing system 1A which is performing a variable length code decoding process using a shared-memory to the processing system 2A (step S112, necessary time predicted value receiving step).

In the multi-core processor system of a shared-memory type (101 in FIG. 1), this operation is not necessarily being aware. Even data in a thread operating on a processor can be referred to from a thread operating on a different processor via the shared cache memory 130 or the main memory 140 by writing out to the memory. Therefore, transmission of the predicted value will be completed by writing the predicted value to the memory after being derived by the necessary time prediction unit 12.

Next, the data read-ahead controller 22 of the processing system 2A determines a data read-ahead interval which is a control parameter of data read-ahead, based on the predicted value of the decoding time stored in the inter-thread communication unit 200. A model in which a data read-ahead necessary time and the number of cycles of NOP loop are correlated is prepared beforehand, and the minimum parameter value is set to be the "maximum number of cycles in which the data read-ahead necessary time does not exceed the variable length code decoding necessary time" (step S113, data read-ahead interval setting step).

Although competitions due to data accessing are reduced as the interval becomes longer, if the data read-ahead necessary time exceeds the variable length code decoding necessary time, the necessary processing time for decoding a moving picture becomes longer.

Next, with the determined parameter, the data read-ahead processor 21 performs data read-ahead. In an architecture in which a dedicated command for data read-ahead is prepared, data read-ahead is performed using the dedicated command. On the other hand, in an architecture in which no dedicated command for data read-ahead is prepared, it is required to perform data read-ahead explicitly. In such a case, an access is performed to the memory address using a data access command such as a read command or a write command, and the data is stored from the main memory 140 into the cache memory 130 (step S114).

In the case that no dedicated command for data read-ahead is prepared, as the actual data other than the access command also passes through a bus (161 in FIG. 1) linking the memory controller (120 in FIG. 1) and the cache memory 130, competitions will be caused easily in the bus 161. Therefore, an effect of the exemplary embodiment in which memory access competitions are reduced can be achieved significantly.

The operational content of the step S114 will be repeated until the data read-ahead ends (step S115).

In this way, as a memory access controlling function of the data read-ahead controller 22 operates effectively in performing data read-ahead by the data read-ahead processor 21, and the necessary time for a parallel process by the parallel execution processor 11 in another processor 1 is balanced at real time as described above, it is possible to effectively suppress or prevent deterioration in the processing capability caused by memory access competitions between processors. As such, the exemplary embodiment has an advantage of realizing effective memory accessing.

Note that, in the description of the operation of the second exemplary embodiment, the operational contents of the respective steps may be configured as programs so as to cause a computer to perform the operations. With this configuration, the same operational effects as those of the first exemplary embodiment can be realized.

Third Exemplary Embodiment

Next, an example in which the data read-ahead controller 22 monitors another processor and sets an interval between data read-ahead processes based on the processing conditions by the processor will be described as a third exemplary embodiment.

As shown in FIG. 8, in the third exemplary embodiment of the present invention, the data read-ahead controller 22 includes an another processor monitoring unit 23 which monitors processing conditions of a processor other than the processor which performs a process of a data read-ahead thread. The data read-ahead controller 22 controls an interval between data read-ahead processes by comparing the processing status by the processor monitored by the another processor monitoring unit 23 and the processing status by the processor performing a process of the data read-ahead thread. Further, the data read-ahead controller 22 has a control parameter for a data read-ahead process as an initial value, and resets the control parameter corresponding to the processing status by the processor monitored by the another processor monitoring unit 23.

Specifically, in the third exemplary embodiment of FIG. 8, the data read-ahead controller 22 in a processing system 2B has the another processor monitoring unit 23 which monitors the progress of data processing by the parallel execution processor 11 in a processing system 1B. Further, the data read-ahead controller 22 variably sets an interval between data read-ahead processes to be performed by the data read-ahead processor 21 based on information regarding the progress of the data processing by the parallel execution processor 11 output from the another processor monitoring unit 23.

Note that the data read-ahead controller 22 is configured to reset the interval between data read-ahead processes such that the interval becomes longer if the data processing by the data read-ahead processor 21 is ahead of the data processing by the parallel execution processor 11, and the interval becomes shorter if the data processing by the data read-ahead processor 21 is behind the data processing by the parallel execution processor 11.

The third exemplary embodiment is different from the first exemplary embodiment in that prediction of a necessary time for a parallel execution process is not performed (the necessary time prediction unit 12 is not provided) in the processing system 1B, and the processing system 2B has the another processor monitoring unit 23 for monitoring processing in another processor.

In the exemplary embodiment shown in FIG. 8, the parallel execution process unit 11 transmits the current progress of processing to the inter-thread communication unit 200 while performing predetermined processing.

The another processor monitoring unit 23 reads the processing progress performed by the parallel execution process unit 11, which is to be supplied to the inter-thread communication unit 200, at constant intervals, and provides the read processing progress to the data read-ahead controller 22.

Although the data read-ahead controller 22 determines a control parameter based on the necessary time predicted by the necessary time prediction unit 12 in the first exemplary embodiment, in the third exemplary embodiment, the data read-ahead controller 22, gives a control parameter beforehand as initial setting. On the other hand, although the control parameter is maintained as determined before the data read-ahead processor 21 starts operation in the first exemplary embodiment, in the third exemplary embodiment, the control parameter is configured to be reset during the data read-ahead processor 21 performing processing based on the processing progress supplied from the another processor monitoring unit 23.

In other words, in the third exemplary embodiment, the data read-ahead controller 22 has a predetermined control parameter beforehand as an initial value, and resets the control parameter according to the processing progress which is supplied from the another processor monitoring unit 23.

Further, when the data read-ahead controller 22 acquires the progress of data processing performed by the parallel execution processor 11, the data read-ahead controller 22 also acquires the progress of the data processing performed by the data read-ahead processor 21 simultaneously. Then, the data read-ahead controller 22 compares the pieces of data regarding the progresses of two kinds of processing. If the data processing by the data read-ahead processor 21 is ahead of that by the parallel execution processor 11, the data read-ahead controller 22 determines that the progress of the data read-ahead processor 21 is faster than the optimum setting, so it resets the control parameter so as to extend the data read-ahead interval. In contrast, if the processing by the data read-ahead processor 21 is behind, the data read-ahead controller 22 determines that the progress of the data read-ahead processor 21 is slower than the optimum setting, so it resets the control parameter so as to shorten the data read-ahead interval.

The data read-ahead processor 21 performs predetermined data read-ahead process as described above, and also supplies the current processing progress to the data read-ahead controller 22 as information for resetting a control parameter. Other configurations are the same as those of the first exemplary embodiment.

Operation of Third Exemplary Embodiment

Next, operation of the third exemplary embodiment will be described based on the flowchart shown in FIG. 9.

First, the data read-ahead controller 22 determines a data read-ahead control parameter of the data read-ahead processor 21. Although a control parameter is determined based on the necessary time predicted by the necessary time prediction unit 12 in the first exemplary embodiment, in the third exemplary embodiment, a data read-ahead interval, which is a data read-ahead control parameter of the data read-ahead processor 21, is given beforehand as an initial value as an initial setting (step S201, data read-ahead interval initial value setting step).

Next, according to the control parameter determined in the step S201, a data read-ahead process is performed by the data read-ahead processor 21, and corresponding data is extracted from the main memory 140 and is stored in the cache memory 130 (step S202, data read-ahead processing step).

Then, the data read-ahead controller 22 determines whether or not the read-ahead process by the data read-ahead processor 21 is completed. If the process is completed, the read-ahead process by the data read-ahead processor 21 ends (step S203).

If the read-ahead process by the data read-ahead processor 21 is not completed, the another processor monitoring unit 23 reads out the processing progress of the parallel execution processor 11, and provides the read processing progress to the data read-ahead controller 22 (step S204).

Next, the data read-ahead controller 22 acquires the processing progress of the parallel execution processor 11 and the processing progress of the data read-ahead processor 21 from the another processor monitoring unit 23 and the data read-ahead processor 21. Then, the data read-ahead controller 22 compares the both progresses, and if the data processing by the data read-ahead processor 21 is ahead of the data processing by the parallel execution processor 11, the data read-ahead controller 22 resets the control parameter so as to extend the data read-ahead interval, and if the data processing by the data read-ahead processor 21 is behind, the data read-ahead controller 22 resets the control parameter so as to shorten the data read-ahead interval (step S205, read-ahead interval resetting step).

Note that the reason for monitoring another processor in the step S204 for each predetermined times of read-ahead processes rather than each read-ahead process is to suppress the overhead (and also overhead of the data read-ahead thread 2B) of the another processor monitoring unit 23 due to the monitoring process.

As described above, since the third exemplary embodiment includes the another processor monitoring unit (reference numeral 23 in FIG. 8) for monitoring the processing progress of the parallel execution processor 11 and the data read-ahead controller 22 which compares the acquired progress and the progress of the data read-ahead processor 21 to thereby adjust the interval between data read-ahead processes, it is possible to control data read-ahead processes so as to be dynamically adaptive to a data flow and access timing which vary corresponding to locally biased processing and a delay in the processing due to disturbance factors in the parallel execution processor 11, by adjusting the data read-ahead interval to be optimum according to the progresses of the parallel execution processor 11 and the data read-ahead processor 21.

In other words, as the third exemplary embodiment is configured such that the progress of data processing by the parallel execution processor 11 and the progress of the processing by the data read-ahead processor 21 are monitored and a data read-ahead control parameter is reset according to the state, it is possible to perform data read-ahead processes so as to be dynamically adaptive to a data flow and access timing which vary corresponding to locally biased processing and a delay in the processing due to disturbance factors in the parallel execution processor 11. Thereby, the third exemplary embodiment has an advantage of effectively reducing memory access competitions.

Note that the third exemplary embodiment may be configured as to program the executing contents of the respective steps so as to cause a computer to perform them. Even with such a configuration, the same operational effects as those of the first exemplary embodiment can be achieved.

Fourth Exemplary Embodiment

Next, an example of applying the third exemplary embodiment to an image decoding process will be described as a fourth exemplary embodiment. The fourth exemplary embodiment is configured such that the configuration of an image decoding process includes the another processor monitoring unit 23 shown in FIG. 8 instead of the variable length code decoding necessary time prediction unit 522 shown in FIG. 4. The another processor monitoring unit 23 is configured to monitor the processing progress of another processor, that is, a variable length code decoder 521 specifically (see FIG. 4), and the data read-ahead controller 22 is configured to reset a control parameter which determines an interval between data read-ahead processes upon receiving information from the another processor monitoring unit 23. These aspects are different from the second exemplary embodiment.

Operation of the fourth exemplary embodiment will be described based on FIG. 10. Although in the second exemplary embodiment described above a control parameter is determined based on the predicted value acquired by the variable length code decoding necessary time prediction unit 522, in the fourth exemplary embodiment, control information of a data read-ahead interval is set beforehand in the data read-ahead controller 22 as initial setting. Note that the data read-ahead interval may be 0 in the initial setting, and adjustment will be made during a data read-ahead process performed by the data read-ahead controller 22 (step S211, data read-ahead interval initial value setting step).

Then, data read-ahead processes are performed for a certain number of times. In the fourth exemplary embodiment, the number of times is set to be the number capable of performing data read-ahead processes for one line in a horizontal direction of a macro block. In general, a decoding process of a moving image is performed in a unit of macro block. The decoding process by the variable length code decoder 521 described above is performed in a macro block unit actually, so performing a data read-ahead process in a macro block unit is objectively reasonable (step S212, data read-ahead process step).

The reason why data read-ahead processes are performed for one macro block line is that if monitoring is performed for each macro block, the overhead due to the control becomes large. Another reason is that pieces of pixel data are not continued in a macro block, and pieces of data are secured continuously in a memory only when they are in a macro block line. Therefore, reading to a cache line is efficient.

Then, it is determined whether or not the read-ahead process by the data read-ahead processor 21 is completed. If it is completed, the read-ahead process by the data read-ahead processor 21 ends (step S213).

Then, after performing data read-ahead for one macro block line, the data read-ahead controller 22 of the data read-ahead thread 28 acquires the progress of the data processing performed by the variable length code decoder 521 (step S214).

At this time, if the processing by the variable length code decoder 521 is not completed for one macro block line, it is determined that the data processing by the data read-ahead processor 21 is ahead of the optimum setting, so the data read-ahead interval is extended to delay the progress of the data read-ahead processor 21. In contrast, if the variable length code decoder 521 performs the processing exceeding the one macro block line, it is determined that the data processing by the data read-ahead processor 21 is behind the optimum setting, so the data read-ahead interval is controlled to shorten so as to advance the data processing by the data read-ahead processor 21 (step S215, read-ahead interval resetting step).

Data read-ahead for one macro block line, monitoring of the progress of the processing by the variable length code decoder 521, and resetting of the data read-ahead interval parameter will be repeated until the data processing by the data read-ahead processor 21 ends.

Fifth Exemplary Embodiment

Next, an example of determining an interval between data read-ahead processes based on a necessary time required for parallel process and processing status of another processor will be described as a fifth exemplary embodiment.

As shown in FIG. 11, the fifth exemplary embodiment includes the necessary time prediction unit 12 which predicts a necessary time for a parallel process according to an input value of the parallel process in the parallel execution thread, and the data read-ahead controller 22 includes the another processor monitoring unit 23 which monitors the processing status of a processor other than the processor which performs processing of the data read-ahead thread. The data read-ahead controller 22 controls an interval between the data read-ahead processes according to the processing status in the parallel execution thread by the processor monitored by the another processor monitoring unit 23, the processing status of the processor performing the processing of the data read-ahead thread, and the necessary time predicted by the necessary time prediction unit.

The data read-ahead controller 22 may determine a control parameter for performing processing of the data read-ahead thread based on the predicted value of the necessary time predicted by the necessary time prediction unit 12, and reset the control parameter according to the processing status of the parallel execution thread by the processor monitored by the another processor monitoring unit.

More specific description will be given. As shown in FIG. 11, in the fifth exemplary embodiment, a processing system 1C includes the parallel execution processor 11 and the necessary time prediction unit 12 which predicts a necessary time for data processing by the parallel execution processor 11. Further, a processing system 2C includes the data read-ahead processor 21, the another processor controller 23, and the data read-ahead controller 22 which controls setting of an interval between data read-ahead processes performed by the data read-ahead processor 21 according to the necessary time for data processing by the parallel execution processor 11 predicted by the necessary time prediction unit 12.

Further, the data read-ahead controller 22 includes the another processor monitoring unit 23 which monitors the process of data processing by another processor 1, that is, the parallel execution processor 11 for example, and reads out information regarding the progress. The data read-ahead controller 22 variably sets an interval between data read-ahead processes of the data read-ahead processor 21 according to the progress of data processing by the parallel execution processor 11 which is monitored by the another processor monitoring unit 23.

The fifth exemplary embodiment shown in FIG. 11 is characterized as to have a configuration that the processing system 2C includes the another processor monitoring unit 23 which monitors data processing by another processor, in addition to the configuration of the first exemplary embodiment disclosed in FIGS. 1 to 5. Further, the processor monitoring unit 23, which is newly added in the exemplary embodiment and is not included in the first exemplary embodiment, has the same configuration as that of the third exemplary embodiment. Note that the parallel execution processor 11 performs predetermined data processing, and also supplies information regarding the progress to the one processor 2 side via an inter-thread communication unit 200 at real time as described above.

The another processor monitoring unit 23 reads out the processing progress of the parallel execution processor 11, which is supplied to the inter-thread communication unit 200, at constant intervals, and supplies the read-out processing status to the data read-ahead controller 22. The data read-ahead controller 22 determines a control parameter of the data read-ahead processor 21 as an initial setting, from the data read-ahead and the predicted value of the parallel execution processor 11, in the same manner as that in the first exemplary embodiment. In the fifth exemplary embodiment, the control parameter is reset according to the processing progress supplied from the another processor monitoring unit 23 as in the case of the third exemplary embodiment.

The data read-ahead processor 21 performs predetermined data read-ahead, and supplies the current processing progress number to the data read-ahead controller 22. The other aspects are the same as those of the first and third exemplary embodiments.

Operation of Fifth Exemplary Embodiment

Next, the overall operation of the fifth exemplary embodiment will be described based on FIG. 12.

Note that the operation indicated by the steps S301 to S303 in FIG. 12, that is, operation of determining a data read-ahead control parameter by the necessary time prediction unit 12 and the data read-ahead controller 22 based on the acquired predicted value in the fifth exemplary embodiment is the same as coordinated operation by the necessary time prediction unit 12 and the data read-ahead controller 22 in the first exemplary embodiment (steps S101 to S103 in FIG. 3).

Further, the operations indicated by the step S304 to S307, that is, the respective operations of resetting a control parameter by the data read-ahead processor 21, the another processor monitoring unit 23, and the data read-ahead controller 22 of certain number of times in the fifth exemplary embodiment, are the same as coordinated operations (steps S202 to S205 in FIG. 9) by the respective units 213, 23 and 21 in the second exemplary embodiment.

In other words, the fifth exemplary embodiment is configured such that a data read-ahead control parameter is set by predicting a necessary time for data processing by the parallel execution processor 11 beforehand, and the data read-ahead control parameter is reset according to the processing progress of the parallel execution processor 11 or corresponding to the status acquired by monitoring the processing progress of the data read-ahead processor 21 for a certain number of times. Therefore, it is possible to perform data read-ahead which is dynamically adaptive to variations depending on the input value, locally biased processing, and a data flow or access timing which varies due to delay in the processing caused by disturbances in the parallel execution processor 11, so that the memory access competitions can be reduced effectively.

Note that, in the description of operational of the fifth exemplary embodiment described above, the operational contents of the respective steps may be programmed so as to cause a computer to perform the operations. With such a configuration, the same operational effects as those of the first exemplary embodiment can be achieved.

Sixth Exemplary Embodiment

Next, an example of applying the fifth exemplary embodiment of the invention to an image decoding process will be described as a sixth exemplary embodiment. The configuration of the sixth exemplary embodiment is common to that of the fourth exemplary embodiment shown in FIG. 4, and the another processor monitoring unit 23 shown in FIG. 11 is added thereto. The another processor monitoring unit 23 shown in FIG. 11 monitors the processing progress of the variable length code decoder 521 in FIG. 4 which corresponds to the parallel execution processor 11 shown in FIG. 11, and resets the control parameter based on the monitoring result. This aspect is different from the second exemplary embodiment. In this case, monitoring of the processing progress and resetting of a control parameter are performed with the same configurations and procedures as those in the fourth exemplary embodiment.

Although in the second exemplary embodiment the necessary time for the variable length code decoding 521 is predicted using the bit length of the input bitstream, in the sixth exemplary embodiment, resetting of a control parameter is further performed during a read-ahead process by the data read-ahead processor 21 as described in the third exemplary embodiment.

Operation of the sixth exemplary embodiment will be described based on FIG. 13. First, a variable length code decoding necessary time prediction unit 522 predicts a necessary time for variable length code decoding by using an input value input to the variable length code decoder 521. Note that prediction of the necessary time may be performed by using the bit length of an input bitstream with reference to a model established beforehand as the case of the first exemplary embodiment (step S311, variable length code decoding necessary time prediction step).

Next, the variable length code decoding necessary time prediction unit 522 writes the derived predicted value into the memory so as to transmit it to the inter-thread communication unit 200 (step S312, necessary time predicted value receiving step). Then, the data read-ahead controller 22 reads out the necessary time predicted value for variable length code decoding, and determines a data read-ahead interval which is a control parameter as the initial setting based on the relationship between the data read-ahead necessary time and the NOP loop number of repetition, as in the case of the first exemplary embodiment (step S313).

Then, after the data read-ahead process for one macro block line is performed (step S314), it is determined whether or not the read-ahead process by the data read-ahead processor 21 is completed. If it is completed, the read-ahead process by the data read-ahead processor 21 ends (step S315).

Further, as in the case of the fourth exemplary embodiment, the data read-ahead process for one macro block line and the progress of a decoding process by the variable length code decoder 521 are monitored (step S316), and based on the monitored result, the data read-ahead interval parameter is reset. In other words, if processing by the variable length code decoder 521 is not completed for one macro block line, the data read-ahead interval is controlled to be increased. In contrast, if the decoding process by the variable length code decoder 521 has been performed exceeding one macro block line, the data read-ahead interval is controlled to be reduced (step S317).

Monitoring of the data read-ahead process for one macro block line and the progress of the processing by the variable length code decoder 521, and resetting of the data read-ahead interval parameter will be repeated until data processing by the data read-ahead processor 21 is completed.

In this way, as the another processor monitoring unit 23 of the fourth exemplary embodiment is provided in the sixth exemplary embodiment, by adjusting the data read-ahead interval to be optimum corresponding to the progresses of the processing by the parallel execution processor 11 and the data read-ahead processor 21, it is possible to control data read-ahead process to be dynamically adaptive to a data flow and access timing which varies corresponding to an input value of the parallel execution processor 11, locally biased processing, and a delay in processing due to disturbance factors. Thereby, the object of the present invention can be achieved reliably.

As described above, the exemplary embodiments described above have the following effects.

A first effect is that in a multi-core processor of a shared-memory type, although memory access competitions are caused in performing a memory access neck process such as a data read-ahead process which is mostly configured of accesses to a memory, deterioration in the processing capability of each processor caused by the competitions can be prevented or suppressed effectively so as to realize effective memory accessing.

This is because a necessary time for a data read-ahead process and a necessary time for a parallel process with the data read-ahead which varies due to the effects of reducing access competitions are balanced, so that the optimum data read-ahead interval can be found.

A second effect is that a data read-ahead process can be controlled to be optimum for reducing memory access competitions while being dynamically adaptive to a data flow and access timing which vary due to an input value of a parallel process with data read-ahead process, locally biased processing, a delay in the processing caused by disturbance factors.

This is because the optimum data read-ahead interval can be determined according to the input value of a parallel execution process with data read-ahead process, and the optimum data read-ahead interval can be determined by adjusting the optimum data read-ahead interval corresponding to the progress of the parallel execution process with the data read-ahead process and the progress of the data read-ahead process.

In an exemplary embodiment of the invention, a parallel execution processor is provided with a necessary time prediction unit which inputs information regarding data processing performed by the parallel execution processor and predicts a necessary time for the data processing. The data read-ahead controller may be configured as to control setting of a data read-ahead interval (timing of performing a memory access) of the data read-ahead processor according to the necessary time predicted by the necessary time prediction unit.

With this configuration, as the data read-ahead controller sets the data read-ahead interval (timing of performing a memory access) of the data read-ahead processor according to the necessary time for the data processing predicted by the parallel execution processor, access competitions can be reduced efficiently.

Further, the data read-ahead controller may include an another processor monitoring unit which monitors the progress of data processing by the parallel execution processor, and the data read-ahead controller may have a read-ahead interval variably setting function to variably set the data read-ahead interval between the data read-ahead processes according to the information, regarding the progress of the data processing by the parallel execution processor, which is output from the another processor monitoring unit.

With this configuration, as the status of memory accessing of the other processor can be monitored directly and the progress of the processing can be obtained directly in one processor, the data read-ahead interval between data read-ahead processes can be set variably with high accuracy even during the data processing, there is an advantage that memory access competitions can be reduced effectively.

The data read-ahead controller (read-ahead interval variably setting function) may be configured as to reset the data read-ahead interval to be extended if the data processing by the data read-ahead processor is ahead of the data processing by the parallel execution processor, and to reset the data read-ahead interval to be shortened if the data processing by the data read-ahead processor is behind the data processing by the parallel execution processor.

Further, the parallel execution processor is provided with a necessary time prediction unit which predicts a necessary time for data processing by the parallel execution processor, and the data read-ahead controller sets the data read-ahead interval (timing of performing a memory access) of the data read-ahead processor according to the necessary time for the data processing by the parallel execution processor predicted by the necessary time prediction unit. Further, the present invention may be configured such that the data read-ahead controller has an another processor monitoring unit which monitors the progress of data processing by the parallel execution processor and reads out information regarding the progress, and that the data read-ahead controller variably sets the data read-ahead interval between the data read-ahead processes corresponding to the progress of the data processing by the parallel execution processor.

With this configuration, the data read-ahead interval of the data read-ahead controller can be set promptly and variably by the another processor monitoring unit and the data read-ahead controller according to the progress of the data processing by the parallel execution processor. Thereby, memory access competitions can be prevented effectively, and deterioration in the data processing capabilities of the both can be suppressed effectively.

The present invention may be configured such that the one processor and the other processor are linked by an inter-thread communication unit, and transmittance and reception of information between the processors are carried out via the inter-thread communication unit.

Further, the inter-thread communication unit may be configured as to store communication information by the cache memory, to transmit writing and reading commands by the memory controller to the cache memory, and to control transmission of information between the respective threads.

Still further, the present invention may be configured such that the memory access controlling system is set to be an image decoding system, that the object of data read-ahead is a corresponding address of a frame memory for storing image information generated by an image decoding process, and that the parallel execution process corresponds to variable length code decoding.

Furthermore, the present invention may also be configured such that the memory access controlling system is set to be an image decoding system, that the object of data read-ahead is a corresponding address of a frame memory for storing decoded image information in which a differential image generated by inverse orthogonal transformation and a predicted image generated by motion compensation are added, that the parallel execution process corresponds to variable length code decoding, and that the necessary time prediction unit predicts a necessary time for the variable length code decoding based on the bit length of the bitstream to be input.

Furthermore, in the read-ahead interval resetting step, the content may be set such that the data read-ahead interval is reset to be extended if the data read-ahead process is ahead of the data processing by the parallel execution processor, and that the data read-ahead interval is reset to be shortened if the data read-ahead process is behind the data processing by the parallel execution processor.

Furthermore, it is also acceptable to apply the memory access controlling method to an image decoding method, and to set the object of the data read-ahead to be a corresponding address of a frame memory for storing image information generated through an inverse image decoding process, and to set the parallel execution process to be a variable length code decoding process.

Furthermore, it is also acceptable to apply the memory access controlling method to an image decoding method, and to set the object of the data read-ahead to be a corresponding address of a frame memory for storing decoded image information in which a differential image generated by inverse orthogonal transformation and a predicted image generated by motion compensation are added, to set the parallel execution process to be a variable length code decoding process, and in the necessary time prediction step, to predict a necessary time for a variable length code decoding process based on the bit length of the bitstream to be input.

Furthermore, it is also acceptable to apply the memory access controlling program to an image decoding program, to set the object of the data read-ahead in the program to be a corresponding address of a frame memory for storing decoded image information in which a differential image generated by inverse orthogonal transformation and a predicted image generated by motion compensation are added, to set the parallel execution process to be a variable length code decoding process, and to predict a necessary time for the variable length code decoding process based on the bit length of the bitstream to be input.

Although a control of memory accesses in the data read-ahead process has been described in the above-described embodiments of the invention, the present invention is not limited to the case of data read-ahead. The present invention is applicable to a memory access control in a memory access neck process which is mostly configured of memory accesses. Further, although the multi-core processor system 101 has been exemplary shown as the hardware configuration of a computer system of the present invention, the present invention is not limited to this system. The present invention is applicable to a system in which one thread and another thread are executed simultaneously as executing threads in a single processor as SMT (Simultaneous Multithreading) for example.

Although in the above description the case of performing linear prediction based on the bit length of the input bitstream for predicting the necessary time for a decoding process by the variable length code decoder 521 is exemplary shown, the present invention is not limited to this prediction system. Further, although a process to be performed in parallel with data read-ahead has been described as a process, performed by the variable length code decoder 521, the present invention is not limited to a variable length code decoding process, and is applicable to other processes.

While the invention has been particularly shown and described with reference to exemplary embodiments (examples) thereof, the invention is not limited to these embodiments (examples). It will be understood by those of ordinary skill in the art that various changes in form and details may be made therein without departing from the spirit and scope of the present invention as defined by the claims.

Figure 1:
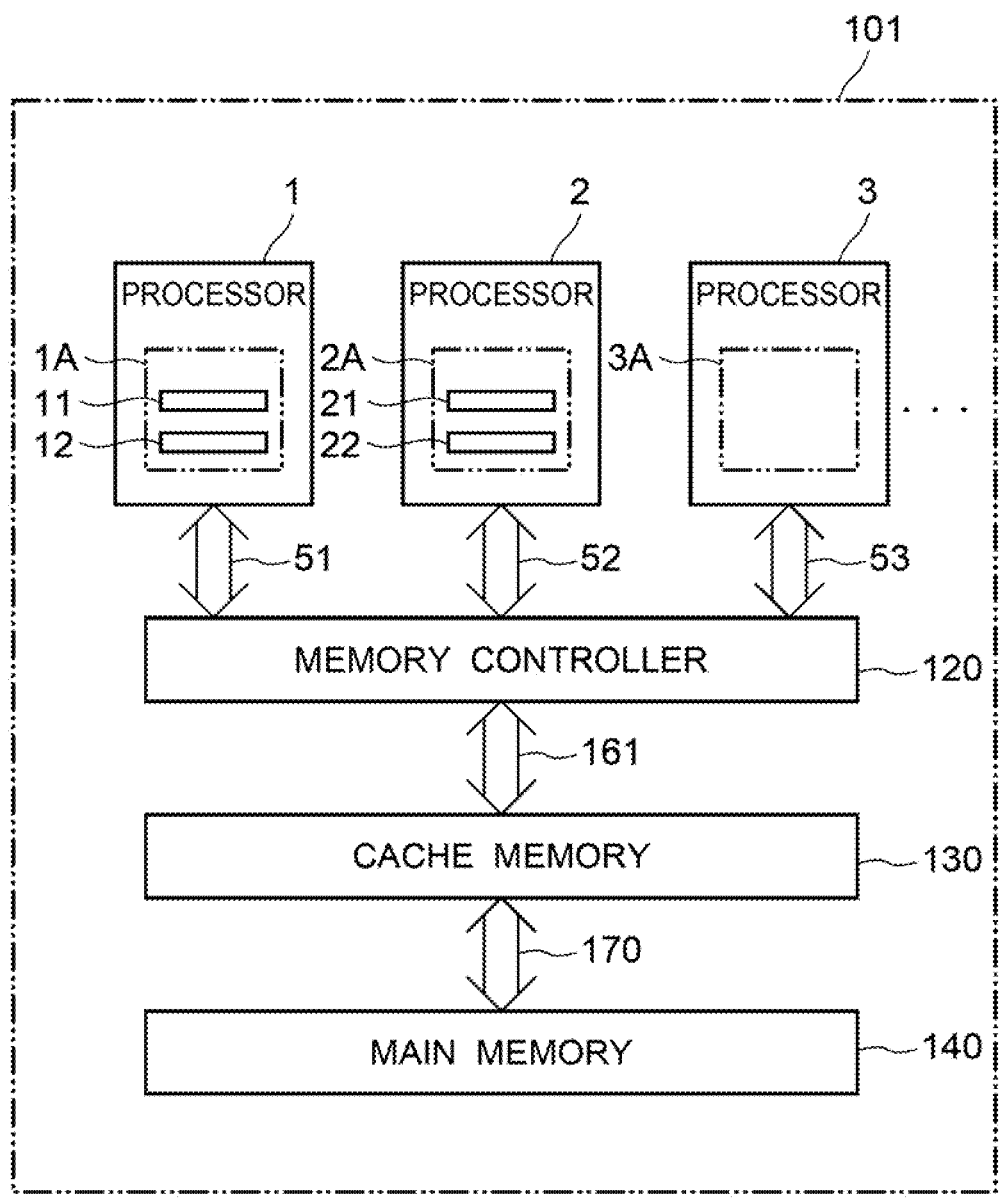
FIG. 1 is a block diagram showing a multi-core processor system including a memory access controller according to the first exemplary embodiment of the invention.
Figure 2:
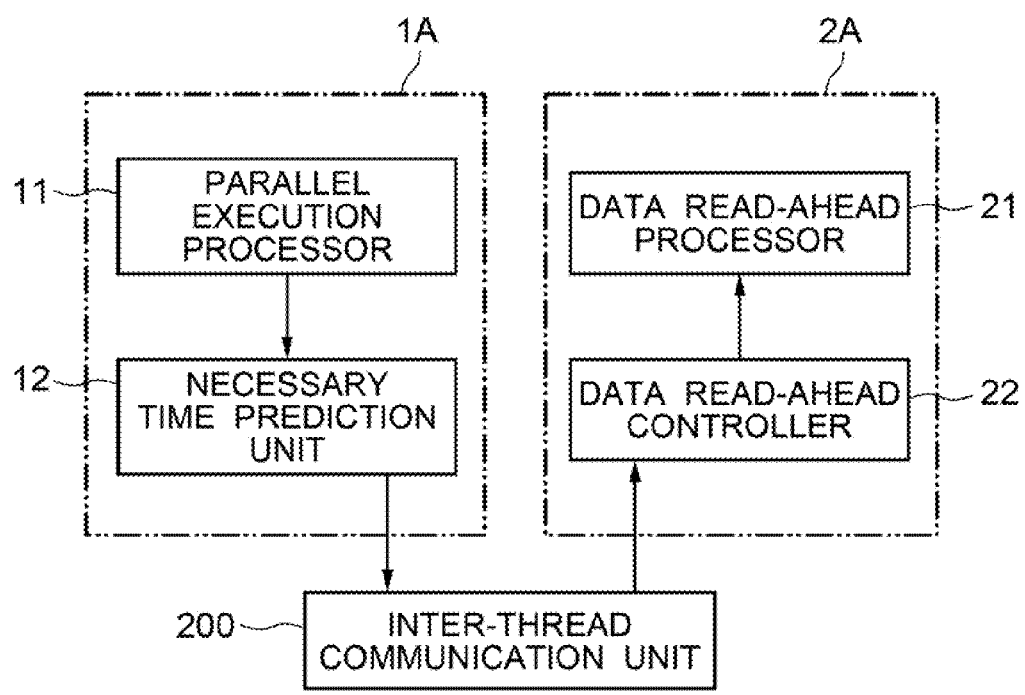
FIG. 2 is a block diagram showing the first exemplary embodiment of the invention.
Figure 3:
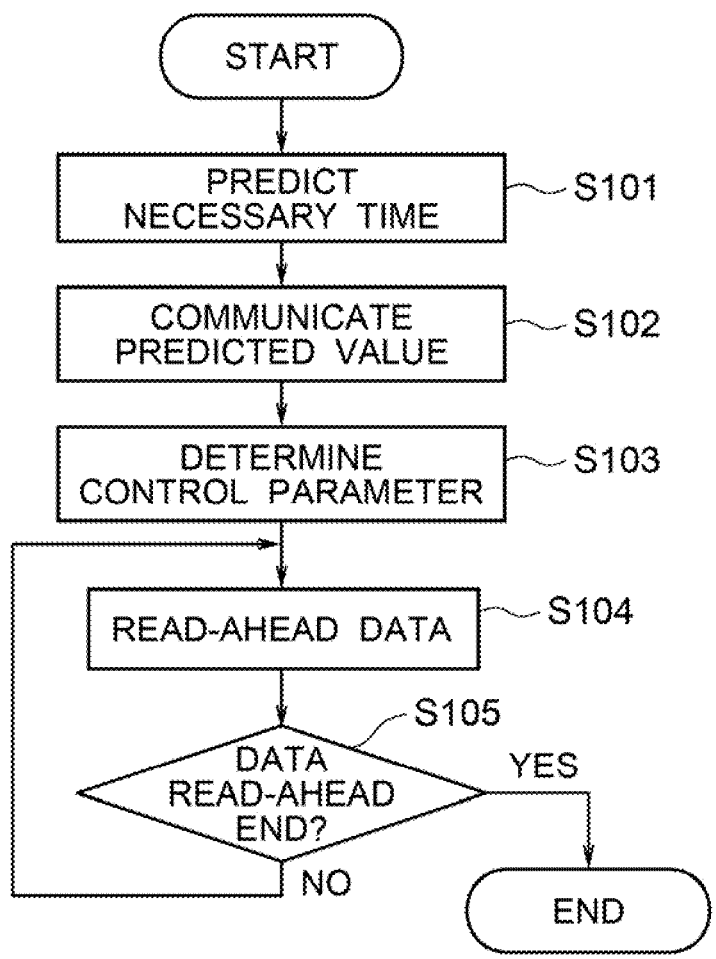
FIG. 3 is a flowchart showing the operation of the first exemplary embodiment disclosed in FIG. 2.
Figure 4:
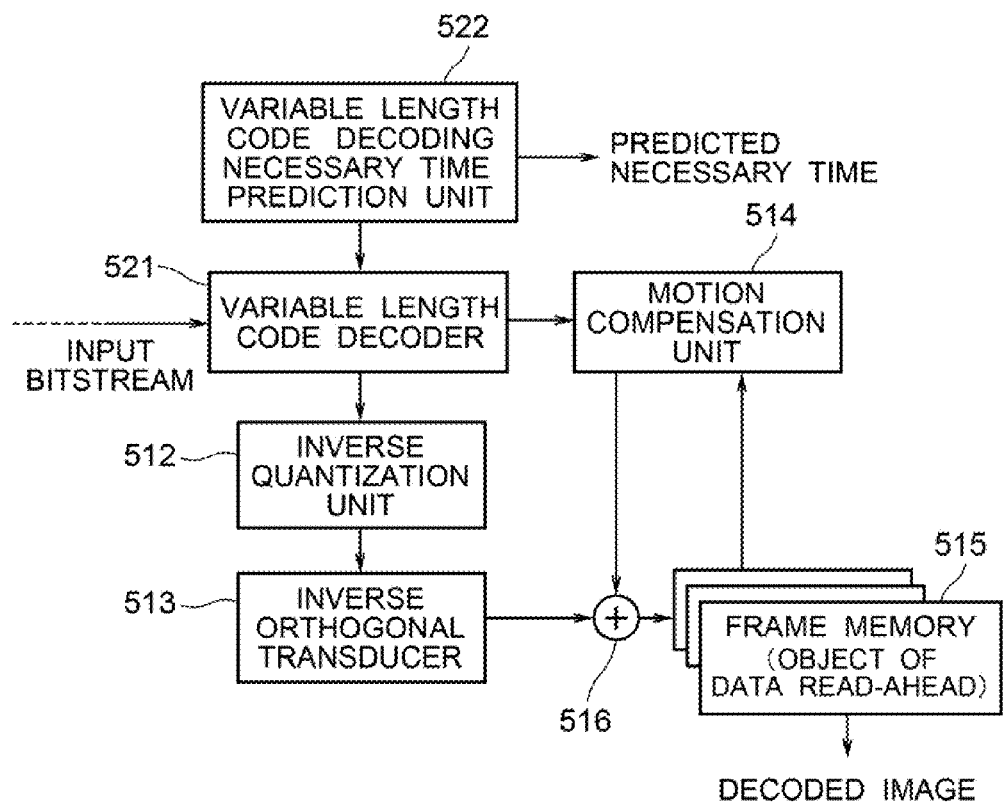
FIG. 4 is a block diagram showing the second exemplary embodiment which is a specific example of the first exemplary embodiment disclosed in FIG. 2.
Figure 5:
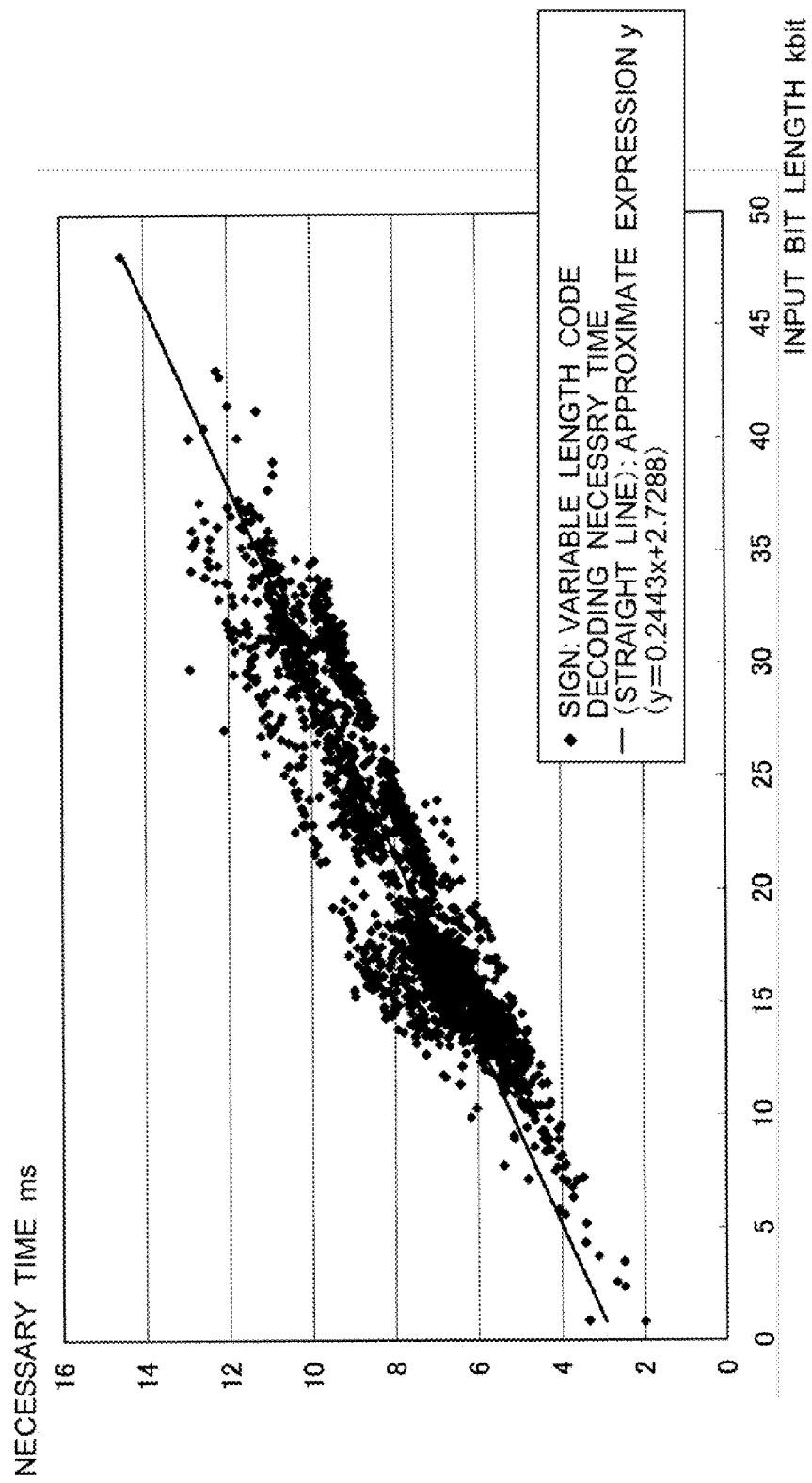
FIG. 5 is a chart showing a correlation between the bit length of an input bitstream and a necessary time for decoding by a variable length code decoder.
Figure 6:
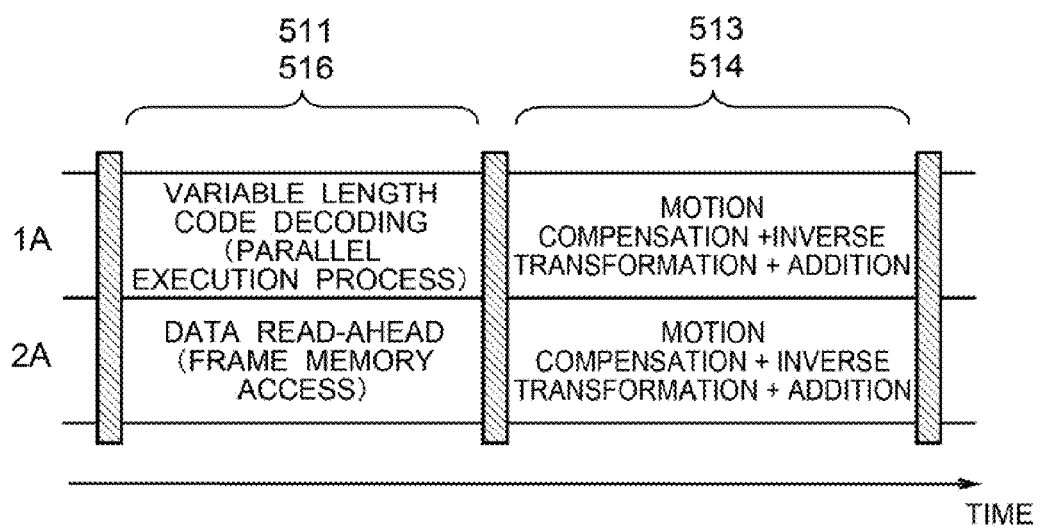
FIG. 6 is an illustration showing a state of the second exemplary embodiment disclosed in FIG. 4 in which variable length code decoding and data read-ahead process are operated in parallel functionally using two threads, and then parallel load distribution processing is performed by dividing the processing by motion compensation and inverse orthogonal transformation within a frame.
Figure 7:
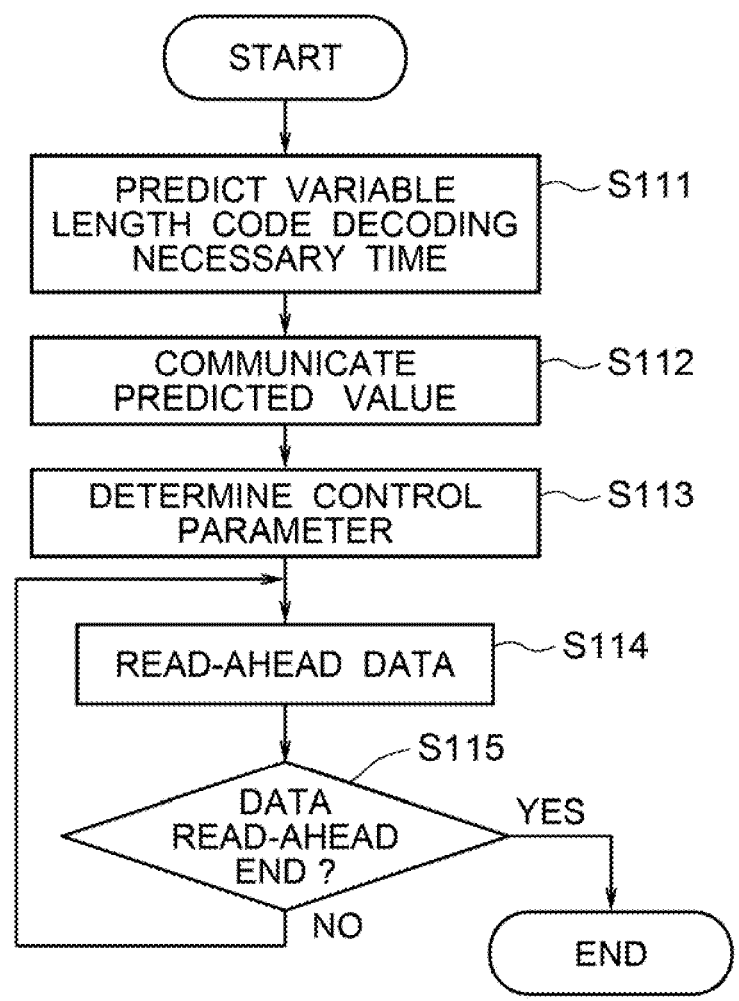
FIG. 7 is a flowchart showing the operation of the second exemplary embodiment.
Figure 8:
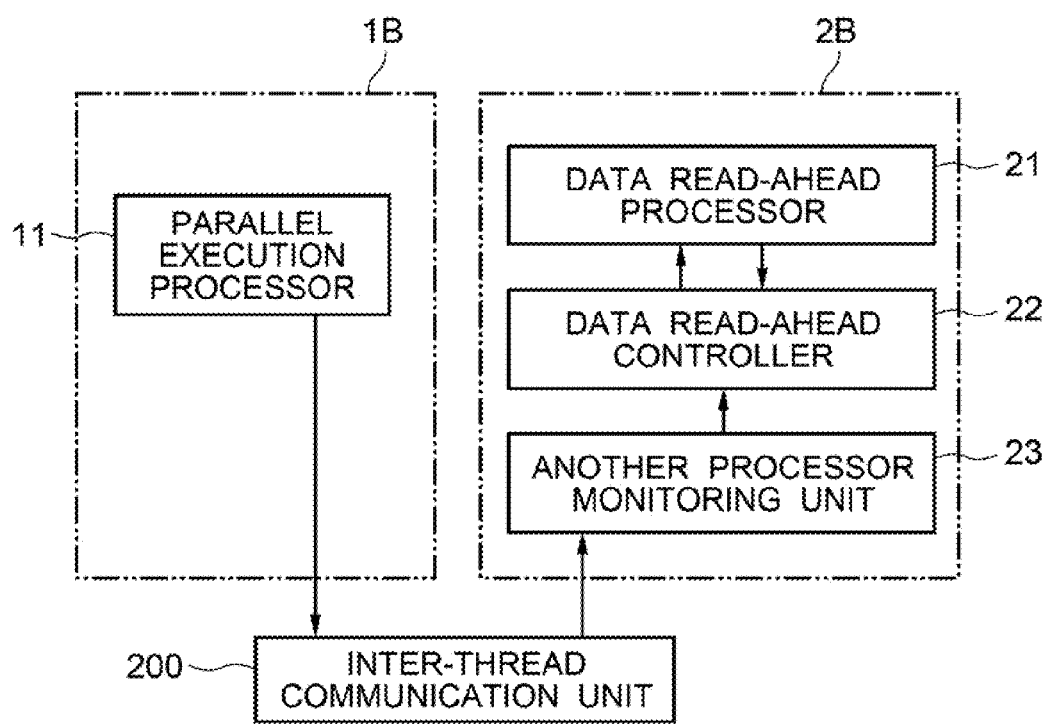
FIG. 8 is a block diagram showing the third exemplary embodiment of the invention.
Figure 9:
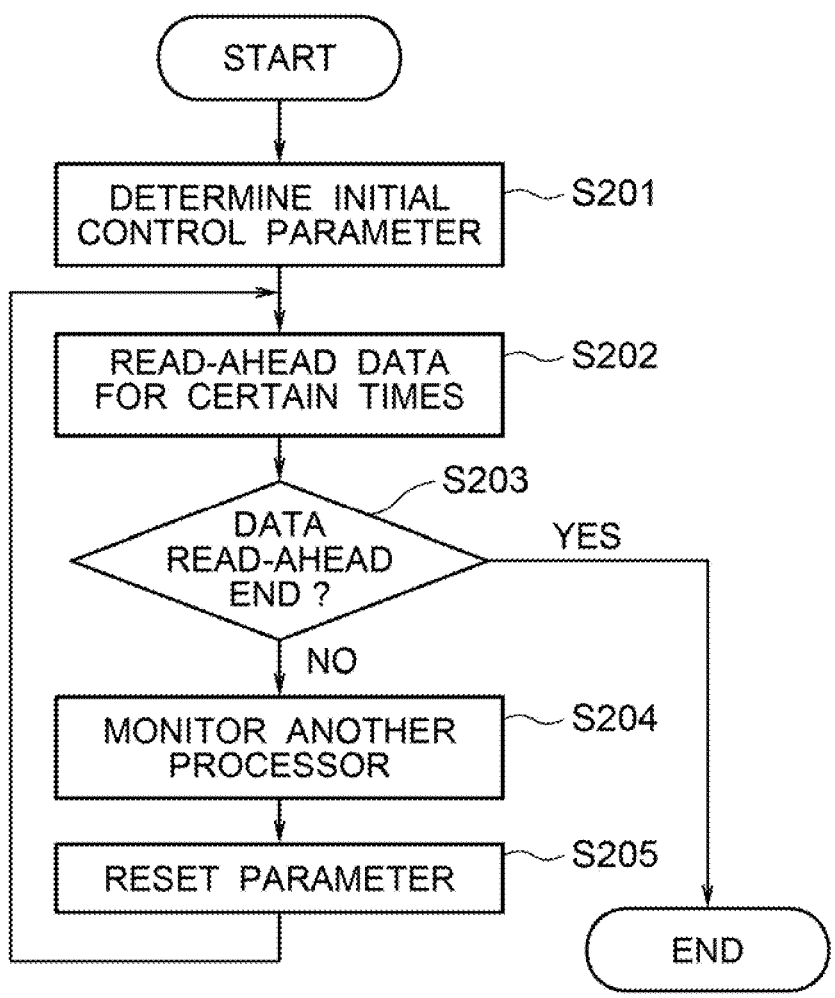
FIG. 9 is a flowchart showing the operation of the third exemplary embodiment disclosed in FIG. 8.
Figure 10:
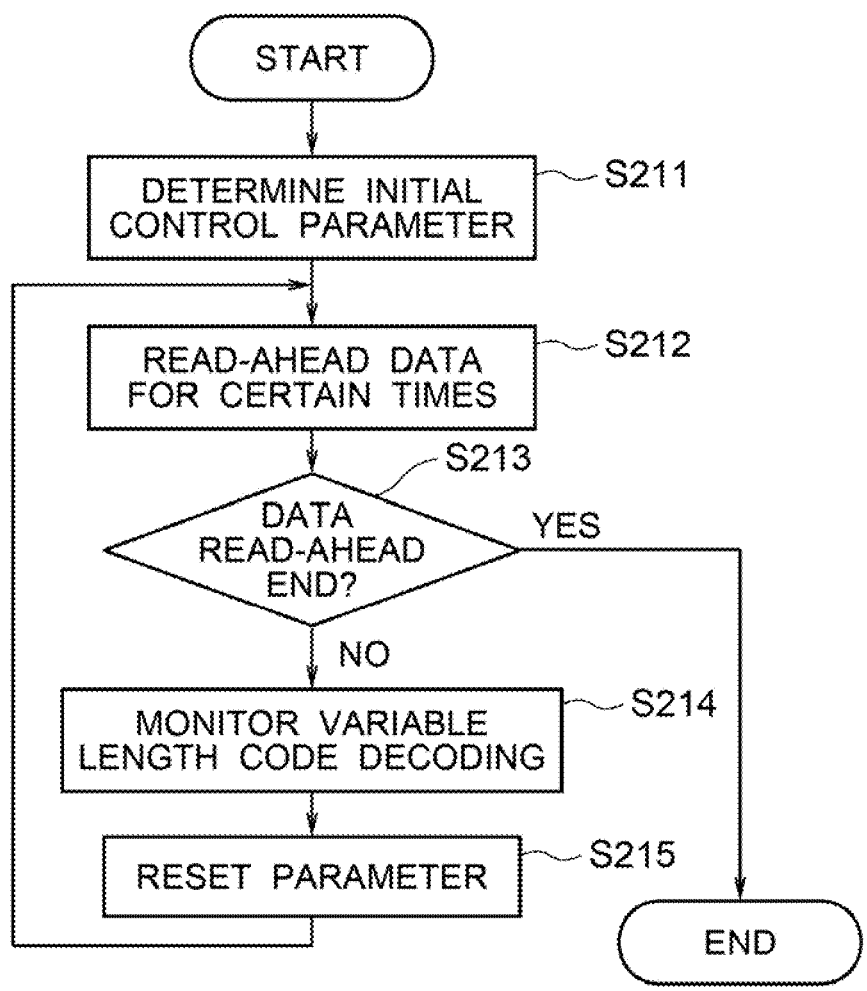
FIG. 10 is a flowchart showing the operation of the fourth exemplary embodiment which is an exemplary application of the third exemplary embodiment.
Figure 11:
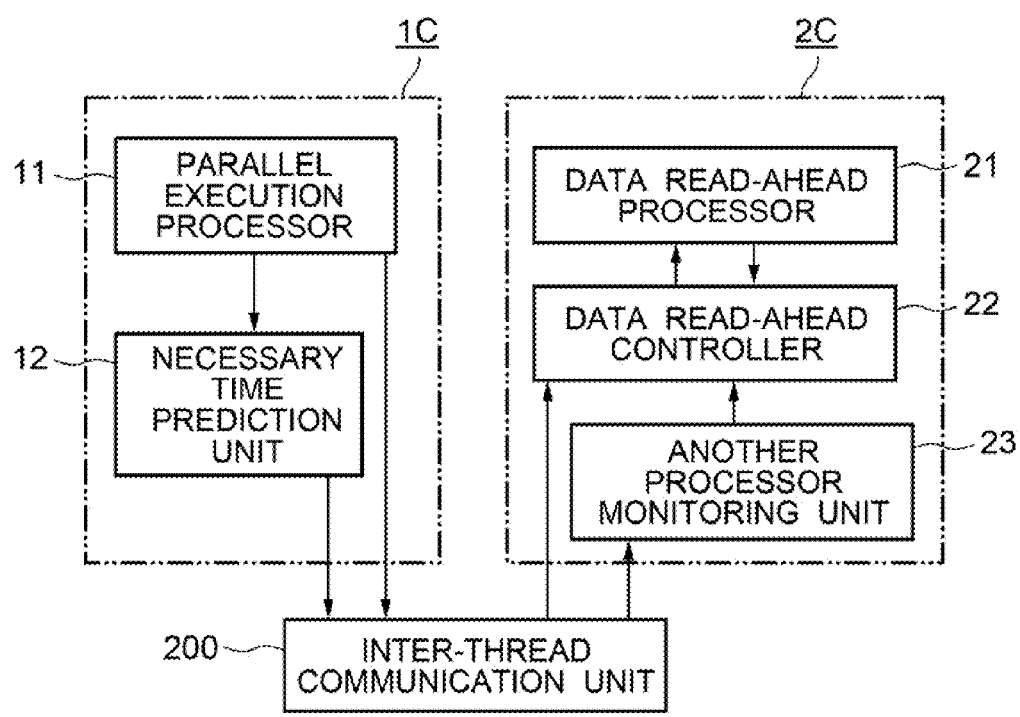
FIG. 11 is a block diagram showing the fifth exemplary embodiment of the invention.
Figure 12:
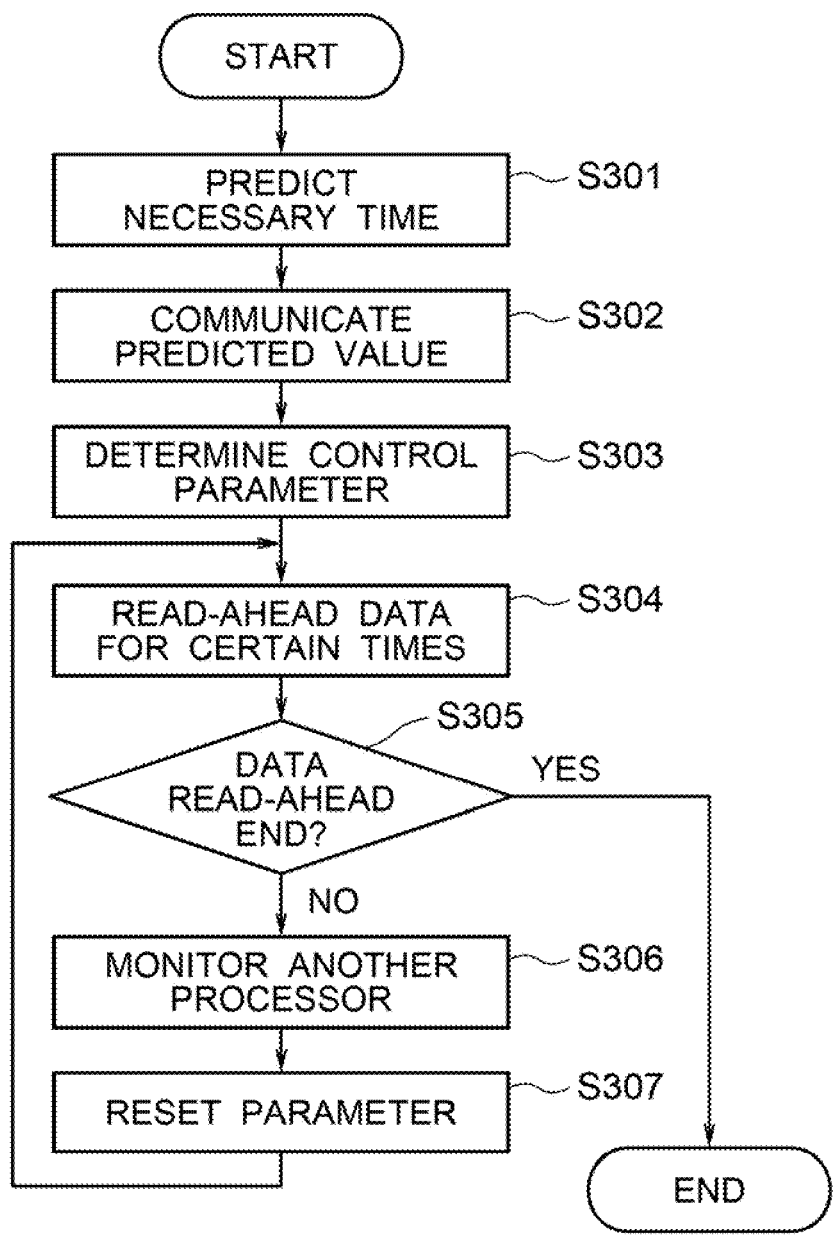
FIG. 12 is a flowchart showing the operation of the fifth exemplary embodiment disclosed in FIG. 11.
Figure 13:
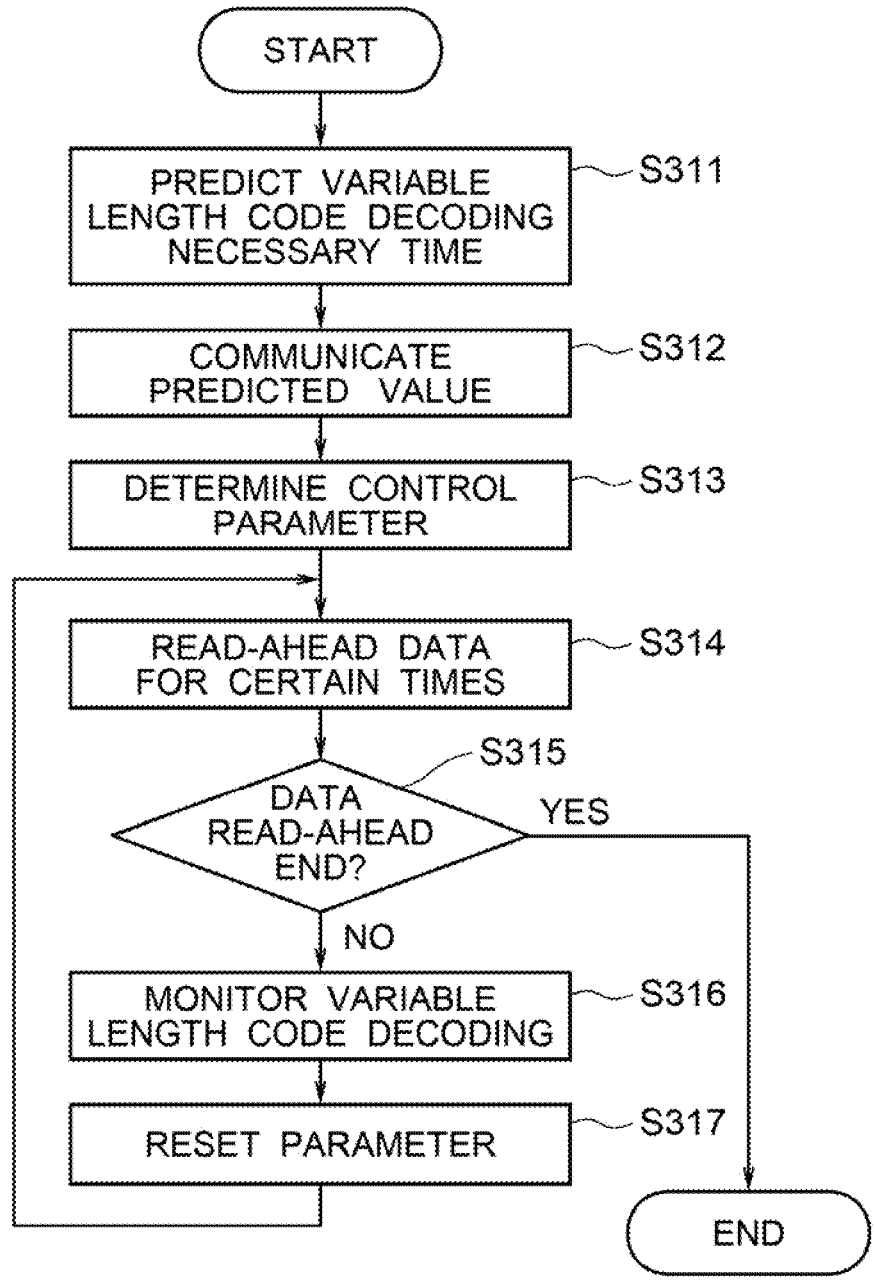
FIG. 13 is a flowchart showing the operation of the sixth exemplary embodiment which is an exemplary application of the fifth exemplary embodiment.
Figure 14:
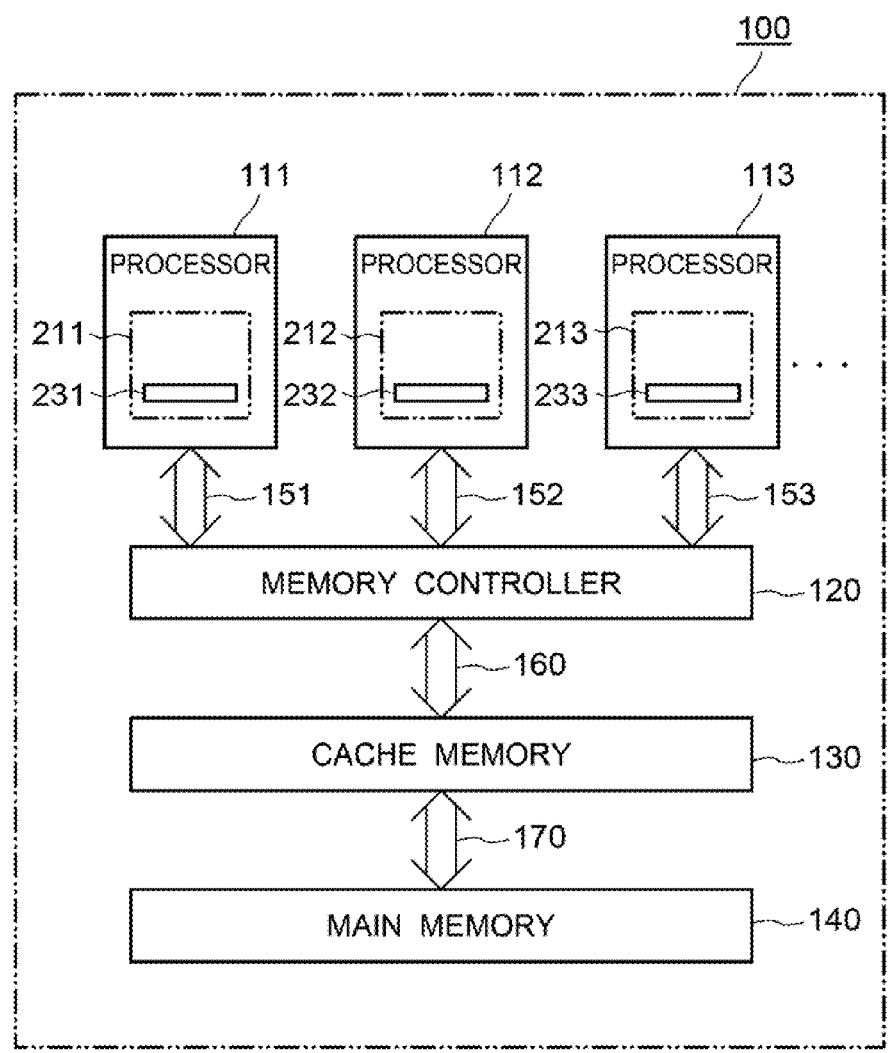
FIG. 14 is a block diagram showing a multi-core processor system of a shared-memory type of a related example.
Figure 15:
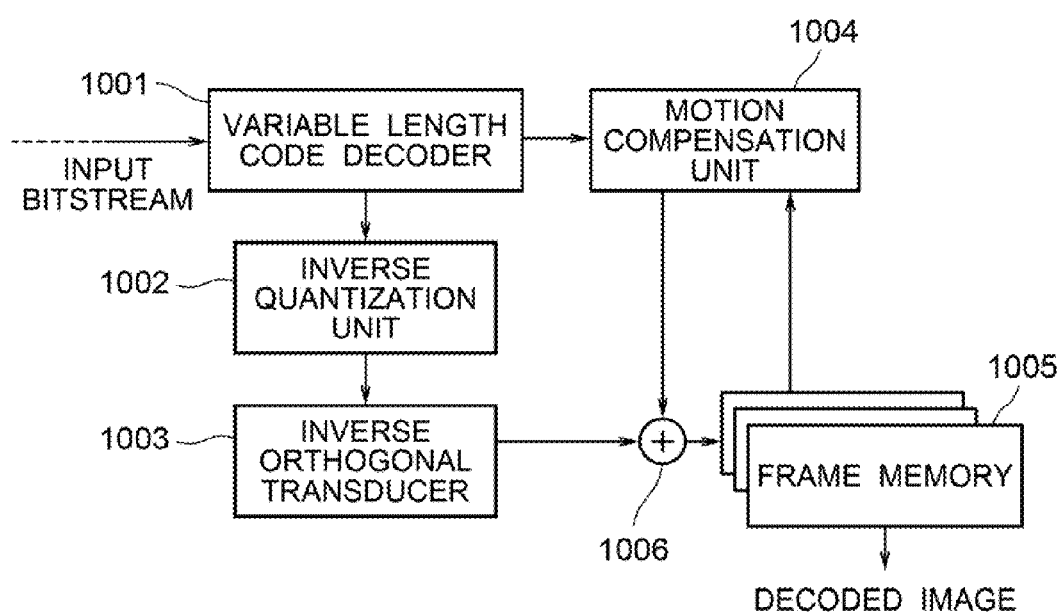
FIG. 15 is a block diagram showing an example of related moving image decoding.
Figure 16:
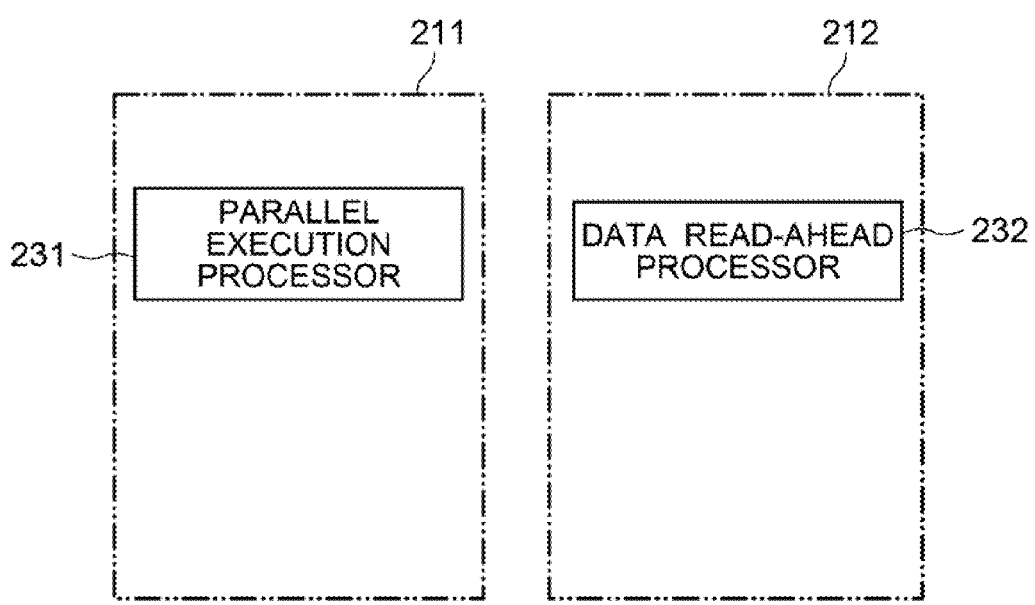
FIG. 16 is a block diagram showing a related example of the memory access controller which constitutes a part of the system disclosed in FIG. 14.
Figure 17:
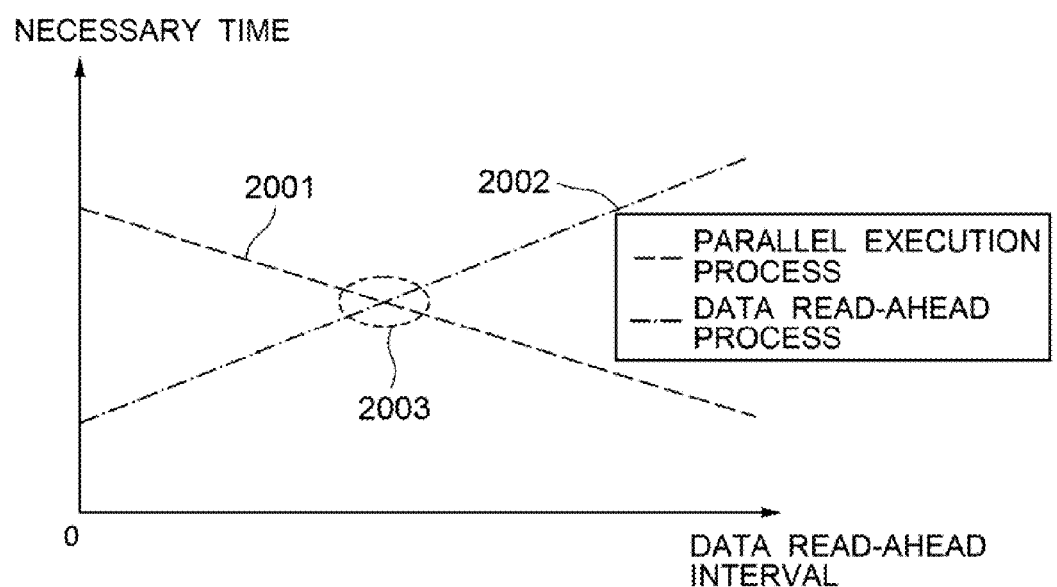
FIG. 17 is an illustration showing the relationship between a data read-ahead interval and a necessary time for parallel execution process.

REFERENCE NUMERALS 1,2,3 Processor
1A,1B,1C Parallel execution thread
2T,2B,2C Data read-ahead thread
11 Parallel execution processor
12 Necessary time prediction unit
21 Data read-ahead processor
22 Data read-ahead controller
23 Another processor monitoring unit
101 Multi-core processor system
120 Memory controller
130 Cache memory
140 Main memory
200 Inter-thread communication unit
514 Motion compensation unit
515 Frame memory
516 Adder
521 Variable length code decoder
522 Variable length code decoding necessary time prediction unit
2001 Necessary time for parallel execution process
2002 Necessary time for the data read-ahead process
2003 Point where the data read-ahead interval becomes the optimum

What is claimed is:

1. A memory access controlling system for reducing access competition among a plurality of processors to a main memory and a cache memory, the memory access controlling system comprising:

the plurality of processors for processing a task including a data read-ahead thread for performing a data read-ahead process and a task including parallel execution thread for performing an execution process in parallel with the data read-ahead process;

the cache memory, a number of the cache memory is one, the cache memory being commonly-accessed by the plurality of processors; and a data read-ahead controller for controlling, when each processor accesses the cache memory, an interval between data read-ahead processes in the data read-ahead thread adapted to a data flow which varies corresponding to an input value of a parallel process in the parallel execution thread.

2. The memory access controlling system, according to claim 1, further comprising a necessary time prediction unit for predicting a necessary time for the parallel process according to the input value of the parallel process in the parallel execution thread, wherein the data read-ahead controller determines a control parameter for controlling the interval between the data read-ahead processes according to the necessary time predicted by the necessary time prediction unit.

3. The memory access controlling system, according to claim 2, wherein the data read-ahead controller determines a control parameter of the data read-ahead process in which memory access competitions are minimum and a data read-ahead interval becomes maximum provided that an ending time of the data read-ahead process does not exceed an ending time of the parallel execution process, based on a predicted value of the necessary time.

4. The memory access controlling system, according to claim 1, wherein the data read-ahead controller includes an another processor monitoring unit for monitoring a processing status of a processor other than a processor which performs the process of the data read-ahead thread, and the data read-ahead controller controls the interval between the data read-ahead processes by comparing a processing status of the processor monitored by the another processor monitoring unit with a processing status of the processor which performs the process of the data read-ahead thread.

5. The memory access controlling system, according to claim 4, wherein the data read-ahead controller has a control parameter of the data read-ahead process as an initial value, and resets the control parameter corresponding to the processing status of the processor monitored by the another processor monitoring unit.

6. The memory access controlling system, according to claim 1, further comprising a necessary time prediction unit for predicting a necessary time for the parallel process according to the input value of the parallel process in the parallel execution thread, wherein the data read-ahead controller includes an another processor monitoring unit for monitoring a processing status of a processor other than a processor which performs the process of the data read-ahead thread, and the data read-ahead controller controls the interval between the data read-ahead processes according to a processing status of the processor in the parallel execution thread monitored by the another processor monitoring unit, a processing status of the processor which performs the process of the data read-ahead thread, and the necessary time predicted by the necessary time prediction unit.

7. The memory access controlling system, according to claim 6, wherein the data read-ahead controller determines a control parameter for performing the process of the data read-ahead thread based on a predicted value of the necessary time predicted by the necessary time prediction unit, and resets the control parameter corresponding to the processing status in the parallel execution thread by the processor monitored by the another processor monitoring unit.

8. A memory access controlling system for reducing access competition among a plurality of processors to a main memory and a cache memory, the memory access controlling system comprising:
the plurality of processors for processing a task including a data read-ahead thread for reading ahead data of a corresponding address of a frame memory for storing decoded image information into a memory and a parallel execution thread for performing a variable length code decoding in parallel with the read-ahead of the corresponding address, the address to be read-ahead by the data read-ahead thread being an address of a frame memory in which the decoded image information formed by adding a differential image generated by inverse orthogonal transformation and predicted information generated by motion compensation is stored;
the cache memory, a number of the cache memory is one, the cache memory being commonly-accessed by the plurality of processors; and
a data read-ahead controller for controlling, when each processor accesses the cache memory, an interval between data read-ahead processes in the data read-ahead thread adapted to a data flow which varies corresponding to an input value of a variable length code decoding process in the parallel execution thread.

9. A non-transitory computer readable recording medium storing a memory access controlling program for reducing access competition among a plurality of processors to a main memory and a cache memory comprising instructions to cause a computer to perform:
a function of processing a task including a data read-ahead thread for performing a data read-ahead process and a task including parallel execution thread for performing an execution process in parallel with the data read-ahead process; and
a function of controlling, when each processor accesses the cache memory, an interval between data read-ahead processes in the data read-ahead thread adapted to a data flow which varies corresponding to an input value of a parallel process in the parallel execution thread,
wherein a number of the cache memory is one and the cache memory being commonly-accessed by the plurality of processors.

10. The non-transitory computer readable recording medium storing the memory access controlling program according to claim 9, further causing the computer to perform:
a function of predicting a necessary time for the parallel process according to an input value of the parallel process in the parallel execution thread; and
a function of determining a control parameter for controlling an interval between the data read-ahead processes based on the necessary time predicted.

11. The non-transitory computer readable recording medium storing the memory access controlling program, according to claim 10, further causing the computer to perform
a function of determining a control parameter of the data read-ahead process in which memory access competitions become minimum and the data read-ahead interval becomes maximum provided that an ending time of the data read-ahead process does not exceed an ending time of the parallel execution process, based on a predicted value of the necessary time.

12. The non-transitory computer readable recording medium storing the memory access controlling program according to claim 9, further causing the computer to perform:
a function of monitoring a processing status of a processor other than a processor which performs a process of the data read-ahead thread; and
a function of controlling an interval between the data read-ahead processes by comparing the processing status of the processor monitored and the processing status of the processor performing the process of the data read-ahead thread.

13. The non-transitory computer readable recording medium storing the memory access controlling program, according to claim 12, further causing the computer to perform
a function of resetting the control parameter of the data read-ahead process stored as an initial value corresponding to the processing status of the processor monitored.

14. The non-transitory computer readable recording medium storing the memory access controlling program, according to claim 9, further causing the computer to perform:
a function of predicting a necessary time for the parallel process according to the input value of the parallel process in the parallel execution thread;
a function of monitoring a processing state of a processor other than a processor which performs a process of the data read-ahead thread; and
a function of controlling an interval between the data read-ahead processes according to a processing status in the parallel execution thread by the processor monitored, a processing status of the processor performing the process of the data read-ahead thread, and the necessary time predicted.

15. The non-transitory computer readable recording medium storing the memory access controlling program, according to claim 14, further causing the computer to perform
a function of determining a control parameter for performing the process of the data read-ahead thread according to the predicted value of the necessary time predicted, and resetting the control parameter corresponding to the processing status in the parallel execution thread by the processor monitored.

16. A non-transitory computer readable recording medium storing a memory access controlling program causing a computer, which constitutes a memory access controlling system for reducing access competition among a plurality of processors to a main memory and a cache memory, the memory access controlling system comprising instructions for causing a computer to perform:
a function of processing a task including a data read-ahead thread for performing a data read-ahead process and a task including parallel execution thread for performing an execution process in parallel with the data read-ahead process;

a function of controlling, when each processor accesses the cache memory, an interval between data read-ahead processes in the data read-ahead thread adapted to a data flow which varies corresponding to an input value of the parallel process in the parallel execution thread, wherein a number of the cache memory is one and the cache memory is commonly-accessed by the plurality of processors.

17. A memory access controlling method for reducing access competition among a plurality of processors to a main memory and a cache memory, the memory access controlling system comprising:

processing a task including a data read-ahead thread for performing a data read-ahead process and a task including parallel execution thread for performing an execution process in parallel with the data read-ahead process;

controlling an interval between data read-ahead processes in the data read-ahead thread adapted to a data flow which varies corresponding to an input value of the parallel process in the parallel execution thread, wherein a number of the cache memory is one and the cache memory is commonly-accessed by the plurality of processors.

18. The memory access controlling method, according to claim 17, further comprising:

predicting a necessary time for the parallel process according to an input value of the parallel process in the parallel execution thread, and determining a control parameter for controlling the interval between the data read-ahead processes according to the necessary time predicted.

19. The memory access controlling method, according to claim 18, further comprising, determining the control parameter of the data read-ahead process in which memory access competitions become minimum and an data read-ahead interval becomes maximum provided that an ending time of the data read-ahead process does not exceed an ending time of the parallel execution process, based on a predicted value of the necessary time.

20. The memory access controlling method, according to claim 17, further comprising:

monitoring a processing status of a processor other than a processor which performs a process of the data read-ahead thread; and controlling the interval between the data read-ahead processes by comparing a processing status of the processor monitored with a processing status of a processor which performs the process of the data read-ahead thread.

21. The memory access controlling method, according to claim 20, further comprising, resetting the control parameter of the data read-ahead process set as an initial value corresponding to a processing status of the processor monitored.

22. The memory access controlling method, according to claim 17, further comprising:

predicting a necessary time for the parallel process according to the input value of the parallel process in the parallel execution thread;

monitoring a processing status of a processor other than a processor which performs the process of the data read-ahead thread; and controlling the interval between the data read-ahead processes according to the processing status in the parallel execution thread by the processor monitored, a processing status by the processor which performs the process of the data read-ahead thread, and the necessary time predicted by the necessary time predicting.

23. The memory access controlling method, according to claim 22, further comprising, determining a control parameter for performing the process of the data read-ahead thread according to the predicted value of the necessary time predicted, and resetting the control parameter corresponding to a processing status of the parallel execution thread by the processor monitored.

24. A memory access controlling system for reducing access competition among a plurality of processors to a main memory and a cache memory, the memory access controlling system comprising:

the plurality of processors for processing a task including a data read-ahead thread for performing a data read-ahead process and a task including parallel execution thread for performing an execution process in parallel with the data read-ahead process;

the cache memory, a number of the cache memory is one, the cache memory being commonly-accessed by the plurality of processors; and data read-ahead control means for controlling, when each processor accesses the cache memory, an interval between data read-ahead processes in the data read-ahead thread adapted to a data flow which varies corresponding to an input value of a parallel process in the parallel execution thread.

25. A memory access controlling system for reducing access competition among a plurality of processors to a main memory and a cache memory, the memory access controlling system comprising:

the plurality of processors for processing a task including a data read-ahead thread for reading ahead data of a corresponding address of a frame memory for storing decoded image information into a memory and a parallel execution thread for performing a variable length code decoding in parallel with the read-ahead of the corresponding address, the address to be read-ahead by the data read-ahead thread being an address of a frame memory in which the decoded image information formed by adding a differential image generated by inverse orthogonal transformation and predicted information generated by motion compensation is stored;

the cache memory, a number of the cache memory is one, the cache memory being commonly-accessed by the plurality of processors; and data read-ahead control means for controlling, when each processor accesses the cache memory, an interval between data read-ahead processes in the data read-ahead thread adapted to a data flow which varies corresponding to an input value of a variable length code decoding process in the parallel execution thread.

* * * * *